United States Patent
Shin et al.

(10) Patent No.: US 11,687,450 B2
(45) Date of Patent: Jun. 27, 2023

(54) STORAGE DEVICE FOR TRANSLATING ADDRESS AND OPERATING METHOD THEREOF

(71) Applicant: SK hynix Inc., Gyeonggi-do (KR)

(72) Inventors: Beom Ju Shin, Gyeonggi-do (KR); Yun Jung Yeom, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/060,157

(22) Filed: Oct. 1, 2020

(65) Prior Publication Data

US 2021/0365369 A1    Nov. 25, 2021

(30) Foreign Application Priority Data

May 19, 2020    (KR) .................. 10-2020-0059801

(51) Int. Cl.
*G06F 12/02* (2006.01)
*G06F 3/06* (2006.01)

(52) U.S. Cl.
CPC .......... *G06F 12/0292* (2013.01); *G06F 3/061* (2013.01); *G06F 3/0652* (2013.01); *G06F 3/0658* (2013.01); *G06F 3/0679* (2013.01); *G06F 2212/2022* (2013.01)

(58) Field of Classification Search
CPC ...... G06F 3/0679; G06F 3/0658; G06F 3/061; G06F 12/0292; G06F 3/0652; G06F 2212/2022; G06F 12/02; G06F 3/06
See application file for complete search history.

(56) References Cited

U.S. PATENT DOCUMENTS

| 2006/0239070 A1* | 10/2006 | Yen ..................... G11C 16/0475 365/185.01 |
| 2008/0151678 A1* | 6/2008 | Ikeda ...................... G11C 8/12 711/E12.003 |
| 2010/0042776 A1* | 2/2010 | Seo ....................... G06F 12/123 711/103 |
| 2010/0328330 A1* | 12/2010 | Watanabe ........... G06F 12/0292 345/531 |

(Continued)

FOREIGN PATENT DOCUMENTS

| KR | 10-1400506 | 5/2014 |
| KR | 10-1805828 | 12/2017 |
| WO | WO-2015005634 A1 * | 1/2015 ......... G06F 12/0246 |

OTHER PUBLICATIONS

"Flash Memory Device and Method" An IP.com Prior Art Database Technical Disclosure, IP.com Electronic Publication, Oct. 10, 2006.*

(Continued)

*Primary Examiner* — Pierre Michel Bataille
(74) *Attorney, Agent, or Firm* — IP & T Group LLP

(57) ABSTRACT

A memory controller controls an address such that a number of chips included in a memory device can increase. The memory controller includes a flash translation layer configured to translate a logical block address received from a host into a physical block address, wherein the flash translation layer determines an addressing unit of at least one of a plurality of addresses in the physical block address based on a request received from the host and a command controller configured to generate a command representing the addressing unit based on the request.

20 Claims, 13 Drawing Sheets

| DQ0 | DQ1 | DQ2 | DQ3 | DQ4 | DQ5 | DQ6 | DQ7 | BYTE ADDDRESSING | SECTOR ADDDRESSING (BLOCK ADDDRESSING) |
|---|---|---|---|---|---|---|---|---|---|
| A0 | A1 | A2 | A3 | A4 | A5 | A6 | A7 | | |
| 0 | 0 | 0 | 0 | 0 | 0 | 0 | 0 | 0byte | 0byte |
| 0 | 0 | 0 | 0 | 0 | 0 | 0 | 1 | 1byte | 512bytes |
| 0 | 0 | 0 | 0 | 0 | 0 | 1 | 0 | 2bytes | 1024bytes |
| 0 | 0 | 0 | 0 | 0 | 0 | 1 | 1 | 3bytes | 1536bytes |
| 0 | 0 | 0 | 0 | 0 | 1 | 0 | 0 | 4bytes | 2048bytes |
| : | : | : | : | : | : | : | : | : | : |
| 1 | 1 | 1 | 1 | 1 | 1 | 1 | 0 | 254bytes | 130048bytes |
| 1 | 1 | 1 | 1 | 1 | 1 | 1 | 1 | 255bytes | 130560bytes |

(56) References Cited

U.S. PATENT DOCUMENTS

| | | | | |
|---|---|---|---|---|
| 2011/0093650 A1* | 4/2011 | Kwon | ................ | G06F 12/0246 |
| | | | | 711/103 |
| 2012/0226887 A1* | 9/2012 | Culley | ............... | G06F 12/1475 |
| | | | | 711/202 |
| 2014/0325117 A1* | 10/2014 | Canepa | .............. | G06F 12/0246 |
| | | | | 711/103 |
| 2014/0372726 A1* | 12/2014 | Koo | ....................... | G06F 12/10 |
| | | | | 711/206 |
| 2016/0077911 A1* | 3/2016 | Malshe | ................. | G11C 29/52 |
| | | | | 714/773 |
| 2016/0378590 A1* | 12/2016 | Roh | .................... | G11C 29/028 |
| | | | | 714/768 |
| 2018/0173419 A1* | 6/2018 | Dubeyko | .............. | G06F 3/0685 |
| 2020/0142636 A1* | 5/2020 | Liao | ....................... | G06F 3/061 |

OTHER PUBLICATIONS

A. Silvagni, G. Fusillo, R. Ravasio, M. Picca and S. Zanardi, "An overview of logic architectures inside flash memory devices," in Proceedings of the IEEE, vol. 91, No. 4, pp. 569-580, Apr. 2003.*
Y. Feng, D. Feng, W. Tong, J. Liu and S. Li, "Multiple Subpage Writing FTL in MLC by Exploiting Dual Mode Operations," in IEEE Transactions on Computer-Aided Design of Integrated Circuits and Systems, vol. 39, No. 3, pp. 599-612, Mar. 2020.*
Kumar, J. Ardeshana and S. Jagtap, "Design & verification of ONFI complient high performance NAND flash controller," 2016 IEEE International Conference on Recent Trends in Electronics, Information & Communication Technology (RTEICT), 2016, pp. 942-945.*

* cited by examiner

| BUS CYCLE | DQ0 | DQ1 | DQ2 | DQ3 | DQ4 | DQ5 | DQ6 | DQ7 | ADDRESS INFORMATION | |
|---|---|---|---|---|---|---|---|---|---|---|
| 1st CYCLE | A0 | A1 | A2 | A3 | A4 | A5 | A6 | A7 | COLUMN ADDR | A[14:0] |
| 2nd CYCLE | A8 | A9 | A10 | A11 | A12 | A13 | A14 | L | | |
| 3rd CYCLE | A16 | A17 | A18 | A19 | A20 | A21 | A22 | A23 | ROW ADDR | WORD LINE | A[24:16] |
| 4th CYCLE | A24 | A25 | A26 | A27 | A28 | A29 | A30 | A31 | | PLANE | A[26:25] |
| 5th CYCLE | A32 | A33 | A34 | A35 | A36 | A37 | A38 | A39 | | BLOCK | A[36:27] |
| | | | | | | | | | | LUN | A[39:37] |

| BUS CYCLE | DQ0 | DQ1 | DQ2 | DQ3 | DQ4 | DQ5 | DQ6 | DQ7 | ADDRESS INFORMATION | | |
|---|---|---|---|---|---|---|---|---|---|---|---|
| 1st CYCLE | A0 | A1 | A2 | A3 | A4 | A5 | A6 | A7 | COLUMN ADDR | | A[7:0] |
| 2nd CYCLE | A8 | A9 | A10 | A11 | A12 | A13 | A14 | A15 | ROW ADDR | WORD LINE | A[24:8] |
| 3rd CYCLE | A16 | A17 | A18 | A19 | A20 | A21 | A22 | A23 | | | |
| 4th CYCLE | A24 | A25 | A26 | A27 | A28 | A29 | A30 | A31 | | PLANE | A[26:25] |
| 5th CYCLE | A32 | A33 | A34 | A35 | A36 | A37 | A38 | A39 | | BLOCK | A[36:27] |
| | | | | | | | | | | LUN | A[39:37] |

FIG. 8

| DQ0 | DQ1 | DQ2 | DQ3 | DQ4 | DQ5 | DQ6 | DQ7 | BYTE ADDDRESSING | SECTOR ADDDRESSING (BLOCK ADDDRESSING) |
|---|---|---|---|---|---|---|---|---|---|
| A0 | A1 | A2 | A3 | A4 | A5 | A6 | A7 | | |
| 0 | 0 | 0 | 0 | 0 | 0 | 0 | 0 | 0byte | 0byte |
| 0 | 0 | 0 | 0 | 0 | 0 | 0 | 1 | 1byte | 512bytes |
| 0 | 0 | 0 | 0 | 0 | 0 | 1 | 0 | 2bytes | 1024bytes |
| 0 | 0 | 0 | 0 | 0 | 0 | 1 | 1 | 3bytes | 1536bytes |
| 0 | 0 | 0 | 0 | 0 | 1 | 0 | 0 | 4bytes | 2048bytes |
| ⋮ | ⋮ | ⋮ | ⋮ | ⋮ | ⋮ | ⋮ | ⋮ | ⋮ | ⋮ |
| 1 | 1 | 1 | 1 | 1 | 1 | 1 | 0 | 254bytes | 130048bytes |
| 1 | 1 | 1 | 1 | 1 | 1 | 1 | 1 | 255bytes | 130560bytes |

STORAGE DEVICE FOR TRANSLATING ADDRESS AND OPERATING METHOD THEREOF

CROSS-REFERENCE TO RELATED APPLICATION

The present application claims priority under 35 U.S.C. § 119(a) to Korean patent application number 10-2020-0059801, filed on May 19, 2020, which is incorporated herein by reference in its entirety.

BACKGROUND

Field of Invention

One or more embodiments described herein relate to a storage device and a method for operating a storage device.

Description of Related Art

A storage device typically stores data under control of a host such as a computer, smart phone or smart pad. Some storage devices store data on magnetic disks (e.g., Hard Disk Drive), while other storage devices store data in nonvolatile semiconductor memories such as Solid State Drives (SSDs) and memory cards.

Generally, memory devices may be classified as a volatile memory devices and a nonvolatile memory devices. Examples of nonvolatile memory devices include a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), a Ferroelectric RAM (FRAM), and the like.

SUMMARY

Various embodiments provide a storage device which changes a period in which a column address and a row address are input, and a unit in which the column address is input in order to input an address within a limited period, and perform an operation based on the address having the changed period and the changed unit, and an operating method of the storage device.

In accordance with an aspect of the present disclosure, there is provided a memory controller including: a flash translation layer configured to translate a logical block address received from a host into a physical block address, wherein the flash translation layer determines an addressing unit of at least one of a plurality of addresses in the physical block address based on a request received from the host and a command controller configured to generate a command representing the addressing unit based on the request.

In accordance with another aspect of the present disclosure, there is provided a memory device including: an input/output circuit configured to receive a command and an address, a column decoder configured to decode a column address in the address and a control logic configured to receive the command and the address from the input/output circuit and control the input/output circuit and the column decoder to perform an operation based on the command and the address, wherein the control logic generates a selection signal based on whether the command represents an addressing unit of the column address.

In accordance with still another aspect of the present disclosure, there is provided a storage device including a memory device, and a memory controller configured to control the memory device, wherein the memory controller translates a logical block address received from a host into a physical block address and outputs the physical block address to the memory device, wherein the memory controller determines an addressing unit of at least one of a plurality of addresses in the physical block address based on a request from the host, and generates a command representing the addressing unit, and wherein the memory device generates a selection signal based on whether the command represents an addressing unit of at least one of the plurality of addresses in the physical block address.

In accordance with another aspect of the present disclosure, there is provided a method for controlling a storage device comprising, receiving a request from a host, determining an addressing unit of at least one of a plurality of addresses in a physical block address based on the request and generating a command indicating the addressing unit, wherein said determining is performed by a flash translation layer configured to translate a logical block address received from a host into the physical block address.

BRIEF DESCRIPTION OF THE DRAWINGS

Example embodiments will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 8 illustrates a method for addressing a column address according to the present disclosure.

DETAILED DESCRIPTION

The specific structural or functional description disclosed herein is merely illustrative for the purpose of describing embodiments of the present disclosure. The embodiments of the present disclosure can be implemented in various forms, and cannot be construed as limited to the embodiments set forth herein.

Figure 1:
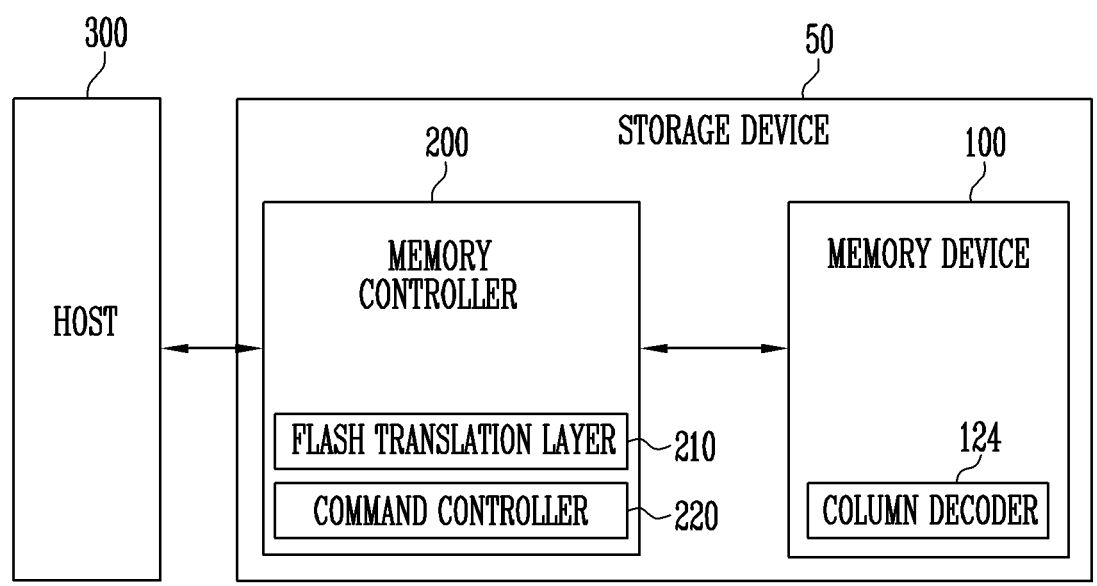
FIG. 1 illustrates an embodiment of a storage device.

FIG. 1 is a block diagram illustrating an embodiment of a storage device 50 which may include a memory device 100 and a memory controller 200. The storage device 50 may store data under control of a host 300. Examples of the host 300 include a mobile phone, a smart phone, an MP3 player, a laptop computer, a desktop computer, a game console, a TV, a tablet PC or an in-vehicle infotainment system.

The storage device 50 may be manufactured as any one of various types of storage devices according to a communication standard, protocol or interface of a host interface. Examples of storage device 50 include a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), and a memory stick.

The storage device 50 may be manufactured as any one of various kinds of package types. For example, the storage device 50 may be manufactured as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data under control of the memory controller 200. The memory device 100 may include a memory cell array including a plurality of memory cells for storing data. The memory cell array may include a plurality of memory blocks, each of which may include a plurality of memory cells. The plurality of memory cells may constitute a plurality of pages. In an embodiment, a page may be a unit for storing data in the memory device 100 or reading data stored in the memory device 100. The memory block may be a unit for erasing data.

In an embodiment, the memory device 100 may include a column decoder 124 which decodes a column address between the column address and a row address (included in an address received from the memory controller 200) and which outputs a signal obtained by decoding the column address. The signal may be, for example, a column address signal indicating memory cells coupled to a specific column, among memory cells included in a specific page buffer or the memory device 100.

In an embodiment, the column decoder 124 may include a multiplexer (MUX). The multiplexer may output a column address signal for designating a page buffer, based on an addressing unit of the column address included in the address received from the memory controller 200. The addressing unit of the column address may be a predetermined size, e.g., 1 byte or 512 bytes. When the addressing unit of the column address is 512 bytes, the addressing unit may be a sector unit.

For example, when the column address received from the memory controller 200 is addressed in a 1-byte unit, the column decoder 124 may output a column address signal of the 1-byte unit. However, when the column address received from the memory controller 200 is addressed in a 512-byte unit (e.g., a sector unit according to one or more embodiments of an addressing method described herein), the column decoder 124 may output a column address signal of the 512-byte unit which is different from the 1-byte unit.

Examples of the memory device 100 include a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is described.

In an embodiment, the memory device 100 may be implemented in a two-dimensional array structure or three-dimensional array structure. For illustrative purposes, the case where the memory device 100 is implemented in a three-dimensional array structure is described as an embodiment. Also, one or more embodiments may be applied not only to a flash memory device in which a charge storage layer is configured with a Floating Gate (FG), but also to a Charge Trap Flash (CTF) in which a charge storage layer is configured with an insulating layer.

In an embodiment, the memory device 100 may be operated using a Single Level Cell (SLC) method in which one data bit is stored in one memory cell. In other embodiments, the memory device 100 may be operated using a method in which at least two data bits are stored in one memory cell. For example, the memory device 100 may be operated using a Multi-Level Cell (MLC) method in which two data bits are stored in one memory cell, a Triple Level Cell (TLC) method in which three data bits are stored in one memory cell, or a Quadruple Level Cell (QLC) method in which four data bits are stored in one memory cell.

The memory device 100 is configured to receive commands and addresses from the memory controller 200 and to access areas selected by the addresses in the memory cell array. For example, the memory device 100 may perform an operation corresponding to a command on an area selected by an address. In an embodiment, the memory device 100 may perform a write (program) operation, a read operation, and an erase operation according to the received command. For example, when a program command is received, the memory device 100 may program data in the area selected by the address. When a read command is received, the memory device 100 may read data from the area selected by the address. When an erase command is received, the memory device 100 may erase data stored in the area selected by the address.

The memory controller 200 may control overall operations of the storage device 50. When a power voltage is applied to the storage device 50, the memory controller 200 may execute firmware (FW) or other instructions. When the memory device 100 is a flash memory device, the memory controller 200 may execute FW such as a Flash Translation Layer (FTL) for controlling communication between the host 300 and the memory device 100.

In an embodiment, the memory controller 200 may include firmware (not shown) which receives data and a Logical Block Address (LBA) from the host 300 and translates the LBA into a Physical Block Address (PBA) representing addresses of memory cells included in the memory device 100, in which data is to be stored. Also, the memory controller 200 may store, in a buffer memory, a logical-physical address mapping table that establishes a mapping relationship between the LBA and the PBA.

The memory controller 200 may control the memory device 100 to perform various operations, for example, a program operation, a read operation, an erase operation, or the like, in response to a request from the host 300. For example, when a program request is received from the host 300, the memory controller 200 may change the program request into a program command and may provide the memory device 100 with the program command, a PBA, and data. When a read request is received together with an LBA from the host 300, the memory controller 200 may change the read request into a read command, select a PBA corresponding to the LBA, and then provide the memory device 100 with the read command and the PBA. When an erase request is received with an LBA from the host 300, the memory controller 200 may change the erase request into an erase command, select a PBA corresponding to the LBA, and then provide the memory device 100 with the erase command and the PBA.

In an embodiment, the memory controller 200 may autonomously generate a program command, an address, and data without any request from the host 300, and may transmit the program command, the address, and the data to the memory device 100. For example, the memory controller 200 may provide the command, the address, and the data to the memory device 100 to perform background operations, e.g., a program operation for wear leveling or a program operation for garbage collection.

In an embodiment, the memory controller 200 may include a flash translation layer 210 which receives a logical block address (LBA) from the host 300. Since the LBA received from the host 300 is addressed in a sector unit, the flash translation layer 210 may translate the LBA into a physical block address (PBA) of a page unit such that the memory device 100 can operate.

In an embodiment, a bit number for translating the LBA into the PBA to be expressed may increase as the capacity of the memory device 100 increases. In some cases, an address output from the memory controller 200 may be input during five periods (or five cycles). Hence, the number of addresses to be expressed through the address input during the five periods (or five cycles) may be limited. For example, although the memory device 100 has a high capacity, the bit number for expressing the address may not be sufficiently secured.

Therefore, in the present disclosure, a method for flexibly changing the address input during the five periods (or five cycles) is described so as to indicate an address of high-capacity memory device 100. In one implementation, flexibly changing an address may include changing a period in which the address is input or changing a bit number used to express the address. In addition, the period in which the address is input or a bit number used to indicate the address may be changed according to a request received from the host 300 or a request generated in the memory controller 200.

In an embodiment, when an operation to be performed in the memory device 100 (according to a request received from the host 300 or an internal operation of the memory controller 200) is a program operation, a read operation, or an erase operation, the flash translation layer 210 may generate a column address of a 512-byte unit based on the LBA received from the host 300. Since column addresses are addressed in 512-byte units, the memory controller 200 may output the column address during a first one period (or one cycle) among five periods (or five cycles) in which an address is output to the memory device 100 and may output a row address during the other four periods (or four cycles).

However, when the operation performed in the memory device 100 (according to the request received from the host 300 or the internal operation of the memory controller 200) is not the program operation, the read operation, or the erase operation, the flash translation layer 210 may translate the LBA received from the host 300 into a column address of a 1-byte unit. The operation performed in the memory device 100 may be, for example, accessing a register, such as a status read operation (Status Read) or a register value setting or read operation (Set/Get Feature). Therefore, the memory controller 200 may output a column address to the memory device 100 during first two periods (two cycles) during five periods (five cycles) in which an address is output, and may output a row address to the memory device 100 during the other three periods (or three cycles).

In an embodiment, the memory controller 200 may include a command controller 220. When an operation to be performed in the memory device 100 according to a request received from the host 300 or an internal operation of the memory controller 200 is a program operation, a read operation, or an erase operation, the command controller 220 may generate a command different from that corresponding to the existing program operation, the existing read operation, or the existing erase operation. For example, the command controller 220 may generate a command representing that a column address corresponding to a corresponding operation is to be translated in a 512-byte unit. Therefore, the memory device 100 may identify whether the column address is translated in a 1-byte unit or a 512-byte unit and may perform the corresponding operation.

However, when the operation to be performed in the memory device 100 (according to the request received from the host 300 or the internal operation of the memory controller 200) is not the program operation, the read operation, or the erase operation, the command controller 220 may generate a command equal to that corresponding to the existing program operation, the existing read operation, or the existing erase operation, and may output the generated command to the memory device 100.

In an embodiment, the storage device 50 may further include a buffer memory (not shown). The memory controller 200 may control data exchange between the host 300 and the buffer memory. In an embodiment, the memory controller 200 may temporarily store system data for controlling the memory device 100 in the buffer memory. For example, the memory controller 200 may temporarily store data input from the host 300 in the buffer memory and then may transmit the data temporarily stored in the buffer memory to the memory device 100.

In various embodiments, the buffer memory may be used as a working memory or cache memory of the memory controller 200. The buffer memory may store codes or commands executed by the memory controller 200. In an embodiment, the buffer memory may store data processed by the memory controller 200. Examples of the buffer memory include a Dynamic Random Access Memory (DRAM) such as a Double Data Rate Synchronous DRAM (DDR SDRAM), a DDR4 SDRAM, a Low Power Double Data Rate 4 (LPDDR4) SDRAM, a Graphics Double Data Rate (GDDR) SDRAM, a Low Power DDR (LPDDR), or a Rambus Dynamic Random Access Memory (RDRAM), or a Static Random Access Memory (SRAM). In various embodiments, the buffer memory may be an external device coupled to the storage device 50. External volatile memory devices coupled to the storage device 50 may perform functions of the buffer memory.

In an embodiment, the memory controller 200 may control at least two memory devices. The memory controller 200 may control the memory devices according to an interleaving method to improve operational performance.

The host 300 may communicate with the storage device 50 using at least one of a Universal Serial Bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
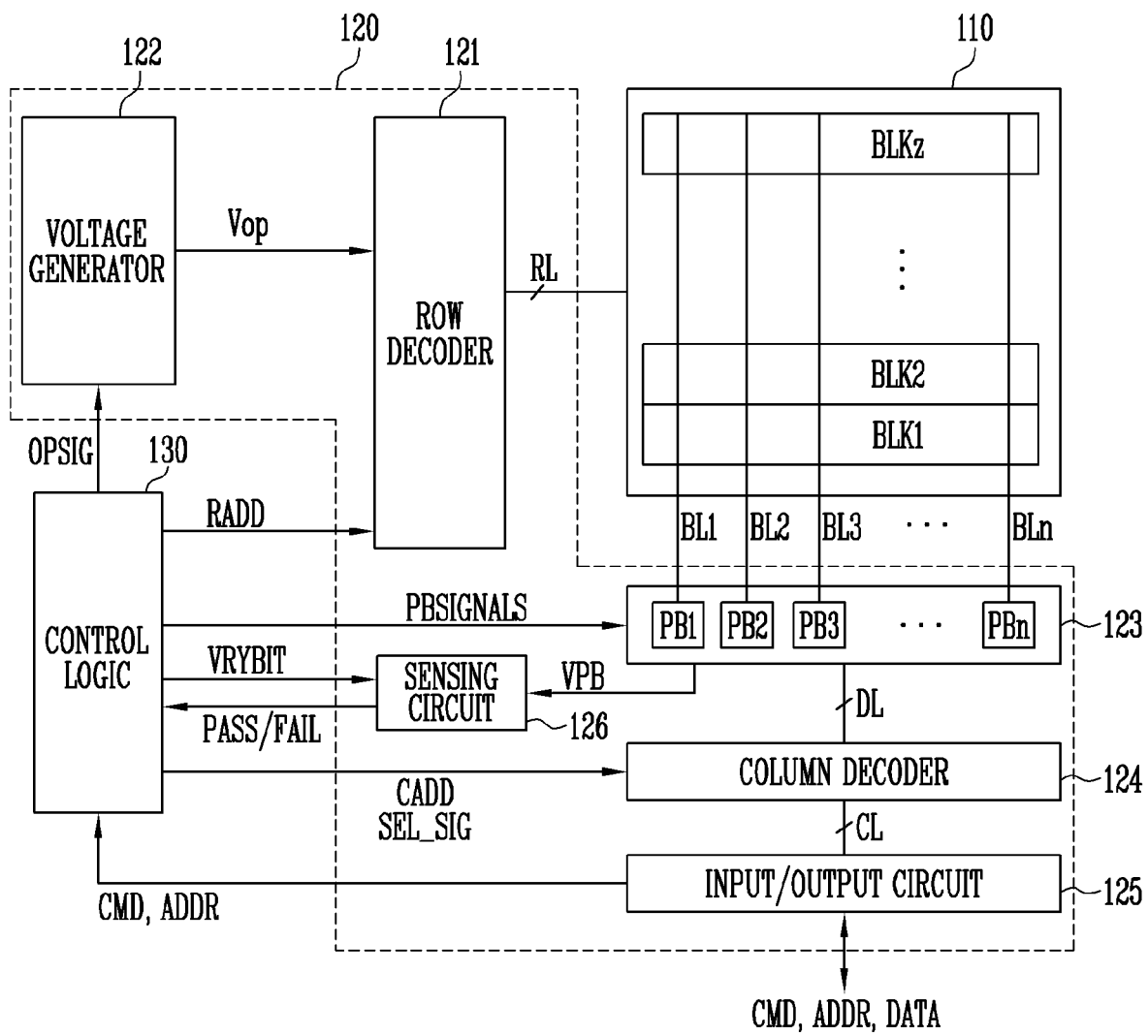
FIG. 2 illustrates an embodiment of a memory device.

FIG. 2 is a diagram illustrating an embodiment of the memory device 100, which may include a memory cell array 100, a peripheral circuit 120, and a control logic 130. The memory cell array 110 includes a plurality of memory blocks BLK1 to BLKz coupled to a row decoder 121 through row lines RL. The plurality of memory blocks BLK1 to BLKz may be coupled to a page buffer group 123 through bit lines BL1 to BLn. Each of the memory blocks BLK1 to BLKz may include a plurality of memory cells. In an embodiment, the memory cells may be nonvolatile memory cells. Memory cells coupled to the same word line may be defined as one page. Therefore, one memory block may include a plurality of pages.

The row lines RL may include at least one source select line, a plurality of word lines, and at least one drain select line. Each of the memory cells included in the memory cell array 110 may be configured as a Single Level Cell (SLC) storing one data bit, a Multi-Level Cell (MLC) storing two data bits, a Triple Level Cell (TLC) storing three data bits, or a Quadruple Level Cell (QLC) storing four data bits.

The peripheral circuit 120 may perform a program operation, a read operation or an erase operation on a selected region of the memory cell array 110 under the control of the control logic 130. The peripheral circuit 120 may drive the memory cell array 110. For example, the peripheral circuit 120 may apply various operating voltages to the row lines RL and the bit lines BL1 to BLn or discharge the applied voltages under the control of the control logic 130.

The peripheral circuit 120 may include the row decoder 121, the voltage generator 122, the page buffer group 123, a column decoder 124, an input/output circuit 125, and a sensing circuit 126. The row decoder 121 is coupled to the memory cell array 110 through the row lines RL which may include at least one source select line, a plurality of word lines, and at least one drain select line. In an embodiment, the word lines may include normal word lines and dummy word lines. In an embodiment, the row lines RL may further include a pipe select line.

The row decoder 121 decodes a row address RADD received from the control logic 130 and selects at least one memory block among the memory blocks BLK1 to BLKz according to the decoded address. The row decoder 121 may also select at least one word line of the selected memory block to apply voltages generated by the voltage generator 122 to the at least one word line WL according the decoded address. For example, in a program operation, the row decoder 121 may apply a program voltage to the selected word line and may apply a program pass voltage having a level lower than that of the program voltage to unselected word lines. In a program verify operation, the row decoder 121 may apply a verify voltage to the selected word line and may apply a verify pass voltage having a level higher than that of the verify voltage to the unselected word lines.

In a read operation, the row decoder 121 may apply a read voltage to the selected word line and may apply a read pass voltage having a level higher than that of the read voltage to the unselected word lines.

In an embodiment, an erase operation of the memory device 100 is performed in a memory block unit. In the erase operation, the row decoder 121 may select one memory block according to the decoded address. In the erase operation, the row decoder 121 may apply a ground voltage to word lines coupled to the selected memory blocks.

The voltage generator 122 operates under the control of the control logic 130. In operation, the voltage generator 122 may generate a plurality of voltages using an external power voltage supplied to the memory device 100. For example, the voltage generator may generate various operating voltages Vop used in program, read, and erase operations in response to an operation signal OPSIG. In an embodiment, the voltage generator 122 may generate a program voltage, a verify voltage, a pass voltage, a read voltage, an erased voltage, and the like, under control of control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages using the external power voltage or the internal power voltage. For example, the voltage generator 122 may include a plurality of pumping capacitors for receiving the internal power voltage and may generate the plurality of voltages by selectively activating the plurality of pumping capacitors under the control of the control logic 130. The plurality of generated voltages may be supplied to the memory cell array 110 by the row decoder 121.

The page buffer group 123 includes first to nth page buffers PB1 to PBn coupled to the memory cell array 110 through respective first to nth bit lines BL1 to BLn. The first to nth bit lines BL1 to BLn operate under the control of the control logic 130. For example, the first to nth bit lines BL1 to BLn may operate in response to page buffer control signals PBSIGNALS. For example, the first to nth page buffers PB1 to PBn may temporarily store data received through the first to nth bit lines BL1 to BLn or may sense a voltage or current of the bit lines BL1 to BLn in a read or verify operation.

Specifically, in a program operation, when a program voltage is applied to a selected word line, the first to nth page buffers PB1 to PBn may transfer data DATA received through the input/output circuit 125 to selected memory cells through the first to nth bit lines BL1 to BLn. Memory cells of a selected page are programmed according to the transferred data DATA. In a program verify operation, the first to nth page buffers PB1 to PBn read page data by sensing a voltage or current received from the selected memory cells through the first to nth bit lines BL1 to BLn.

In a read operation, the first to nth page buffers PB1 to PBn read data DATA from the memory cells of the selected page through the first to nth bit lines BL1 to BLn, and output the read data DATA to the input/output circuit 125 under the control of the column decoder 124.

In an erase operation, the first to nth page buffers PB1 to PBn may float the first to nth bit lines BL1 to BLn or apply an erase voltage.

The column decoder 124 may communicate data between the input/output circuit 125 and the page buffer group 123 in response to a column address CADD. For example the column decoder 124 may communicate data with the first to nth page buffers PB1 to PBn through data lines DL or may communicate data with the input/output circuit 125 through column lines CL. The input/output circuit 125 may transfer a command CMD and an address ADDR, which are received from the memory controller (e.g., 200 shown in FIG. 1), to the control logic 130, or exchange data DATA with the column decoder 124.

In a read operation or verify operation, the sensing circuit 125 may generate a reference current in response to an allow bit VRYBIT signal and may output a pass or fail signal PASS/FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIG-NALS, and the allow bit VRYBIT in response to the command CMD and the address ADDR. For example, the control logic 130 may control a read operation of a selected memory block in response to a sub-block read command and an address. Also, the control logic 130 may control an erase operation of a selected sub-block included in the selected memory block in response to a sub-block erase command and an address. The control logic 130 may determine whether the verify operation has passed or failed in response to the pass or fail signal PASS or FAIL.

Each of the memory cells included in the memory cell array 110 may be programmed to any one program state among a plurality of program states according to data stored therein. A target program state of a memory cell may be determined as any one of the plurality of program states according to data stored in the memory cell.

Figure 3:
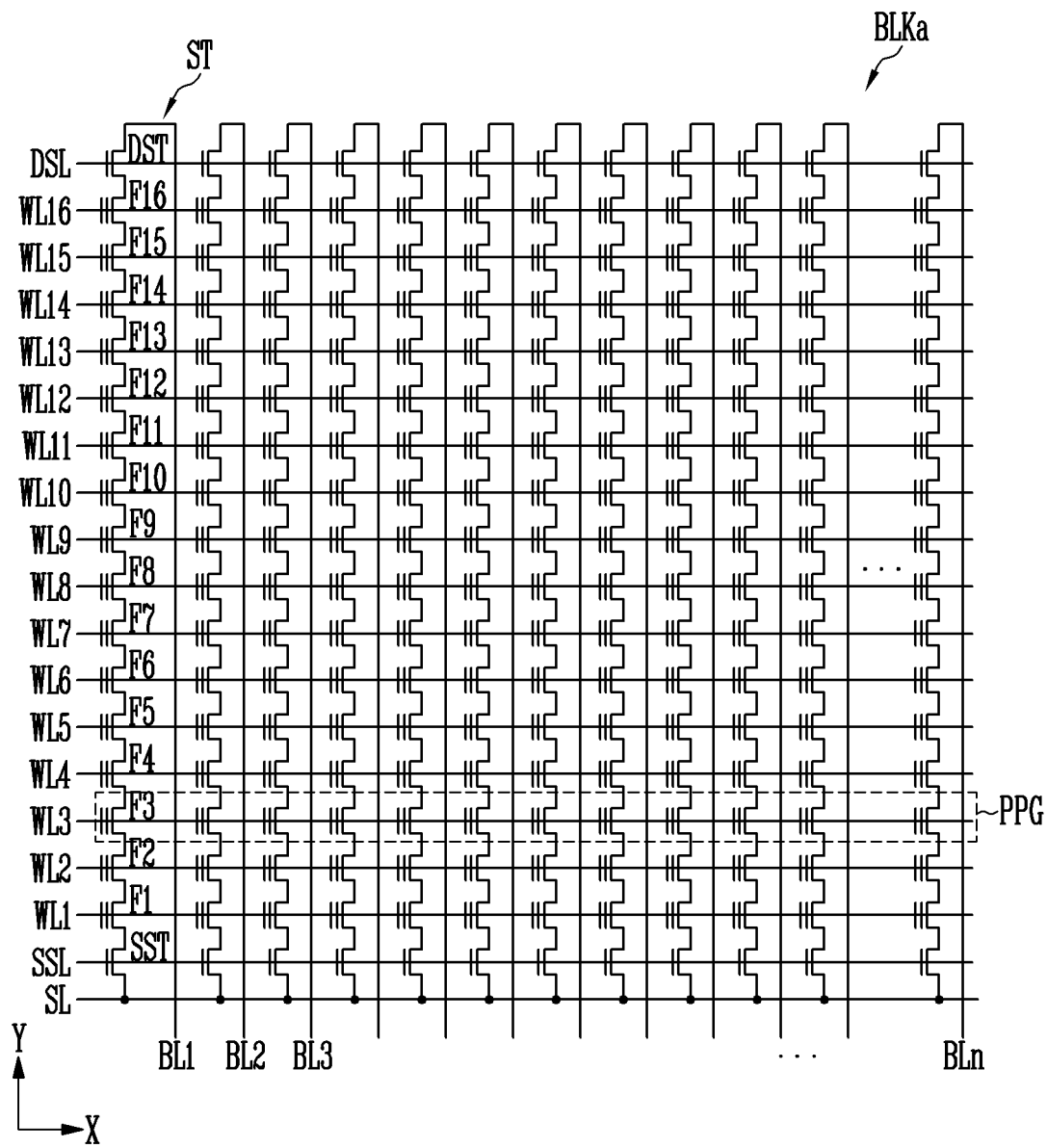
FIG. 3 illustrates an embodiment of a memory cell array.

FIG. 3 is a diagram illustrating an embodiment of the memory cell array shown in FIG. 2. Referring to FIG. 3, a circuit diagram is shown illustrating a memory block BLKa, which may represent the structure of the plurality of memory blocks BLK1 to BLKz in the memory cell array 110 shown in FIG. 2.

In the memory block BLKa, a first select line, word lines, and a second select line are arranged in parallel and may be coupled to each other, e.g., the word lines may be arranged in parallel between the first and second select lines. The first select line may be a source select line SSL, and the second select line may be a drain select line DSL. For example, the memory block BLKa may include a plurality of strings coupled between bit lines BL1 to BLn and a source line SL. The bit lines BL1 to BLn may be respectively coupled to the strings, and the source line SL may be commonly coupled to the strings. The strings may be configured identically to one another. A string ST coupled to a first bit line BL1 will be described as an example.

The string ST may include a source select transistor SST, a plurality of memory cells F1 to F16, and a drain select transistor DAT which are coupled in series to each other between the source line SL and the first bit line BL1. At least one source select transistor SST and at least one drain select transistor DST may be included in one string ST. In an embodiment, a number of memory cells greater than the number of memory cells F1 to F16 shown may be included in the one string ST.

A source of the source select transistor SST may be coupled to the source line SL, and a drain of the drain select transistor DAT may be coupled to the first bit line BL1. The memory cells F1 to F16 may be coupled in series between the source select transistor SST and the drain select transistor DST. Gates of source select transistors SST included in different strings may be coupled to the source select line SSL, and gates of drain select transistors DST included in different strings may be coupled to the drain select line DSL. Gates of the memory cells F1 to F16 may be coupled to a plurality of word lines WL1 to WL16. A group of memory cells coupled to the same word line among memory cells included in different strings may be referred to as a physical page PPG. Therefore, physical pages corresponding to the number of the word lines WL1 to WL16 may be included in the memory block BLKa.

One memory cell may store data of one bit. The memory cell maybe referred to as a single level cell (SLC). One physical page PG may store one logical page (LPG) data. The one LPG data may include a number of data bits which corresponds to the number of cells included in one physical page PPG. In an embodiment, one memory cell MC may store data of two or more bits. In this case, the memory cell may be referred to as a multi-level cell (MLC). One physical page PPG may store two or more LPG data.

A memory cell for storing data of two or more bits may be referred to as the MLC. A memory cell for storing data of three or more bits may be referred to as a triple level cell (TLC), and a memory cell for storing data of four or more bits may be referred to as a quadruple level cell (QLC). Memory cells for storing data of a plurality of bits have been developed, and an embodiment may be applied to memory systems in which data of two or more bits are stored.

In another embodiment, each of the plurality of memory blocks may have a three-dimensional structure. Each memory block may include a plurality of memory cells stacked on a substrate. The plurality of memory cells may be arranged along +X, +Y, and +Z directions.

Figure 4:
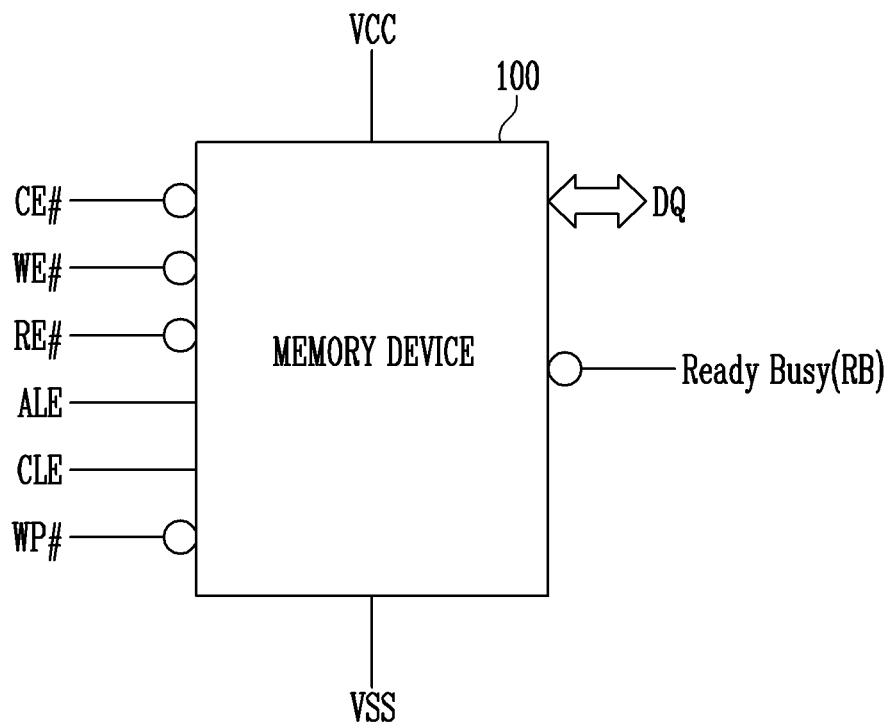
FIG. 4 illustrates an example pin configuration of a memory device.

FIG. 4 is a diagram illustrating an example of a pin configuration of the memory device shown in FIG. 1. Referring to FIG. 4, the memory device (e.g., 100 shown in FIG. 1) may communicate with an external controller through a plurality of input/output lines. For example, the memory device (e.g., 100 shown in FIG. 1) may communicate with the external controller through control signal lines including a chip enable line CE #, a write enable line WE #, a read enable line RE #, an address latch enable line ALE, a command latch enable line CLE, a write prevention line WP #, and a ready busy line RB, and data input/output lines DQ.

The memory device (e.g., 100 shown in FIG. 1) may receive a chip enable signal from the external controller through the chip enable line CE #. The memory device (e.g., 100 shown in FIG. 1) may receive a write enable signal from the external controller through the write enable line WE #. The memory device may receive a read enable signal from the external controller through the read enable line RE #. The memory device (100 shown in FIG. 1) may receive an address latch enable signal from the external controller through the address latch enable line ALE. The memory device (e.g., 100 shown in FIG. 1) may receive a command latch enable signal from the external controller through the command latch enable line CLE. The memory device (e.g., 100 shown in FIG. 1) may receive a write prevention signal from the external controller through the write prevention line WP #.

In an embodiment, the memory device (e.g., 100 shown in FIG. 1) may provide the memory controller (e.g., 200 shown in FIG. 1) with a ready busy signal for outputting whether the memory device (e.g., 100 shown in FIG. 1) is in a ready state or busy state, through the ready busy line RB.

The chip enable signal may be a control signal for selecting the memory device (e.g., 100 shown in FIG. 1). When the chip enable signal is in a 'high' state, and the memory device (e.g., 100 shown in FIG. 1) corresponds to the 'ready' state, the memory device (e.g., 100 shown in FIG. 1) may enter into a low power standby state.

The write enable signal may be a control signal for controlling a command, an address, and input data, which are input to the memory device (e.g., 100 shown in FIG. 1), to be stored in a latch.

The read enable signal may be a control signal for enabling the output of serial data.

The address latch enable signal may be one of control signals used by a host to represent which one of a command, an address, and data the type of a signal input through the input/output lines DQ is.

The command latch enable signal may be one of control signals used by the host to represent which one of the command, the address, and the data the type of a signal input through the input/output lines DQ is. For example, when the command latch enable signal is activated (e.g., logic high), the address latch enable signal is inactivated (e.g., logic low), and the write enable signal is activated (e.g., logic low) and then inactivated (e.g., logic high), the memory device (e.g., 100 shown in FIG. 1) may identify that the signal input through input/output lines DQ is a command. For example, when the command latch enable signal is inactivated (e.g., logic low), the address latch enable signal is activated (e.g., logic high), and the write enable signal is activated (e.g., logic low) and then inactivated (e.g., logic high), the memory device (e.g., 100 shown in FIG. 1) may identify that the signal input through input/output lines DQ is an address.

The write prevention signal may be a control signal for inactivating a program operation and an erase operation, which are performed by the memory device (100 shown in FIG. 1).

The ready busy signal may be a signal for identifying a state of the memory device (e.g., 100 shown in FIG. 1). The ready busy signal in a low state represents that the memory device (e.g., 100 shown in FIG. 1) is performing at least one operation. The ready busy signal in a high state represents that the memory device (e.g., 100 shown in FIG. 1) is not performing any operation.

The ready busy signal may be in the low state while the memory device (e.g., 100 shown in FIG. 1) is performing any one of a program operation, a read operation, and the erase operation. In an embodiment of the present disclosure, the memory controller (e.g., 200 shown in FIG. 1) may determine an end time that is a time at which a program operation or erase operation is ended based on the ready busy signal.

Figure 5A:
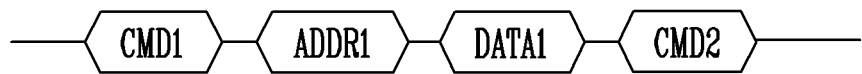
FIGS. 5A and 5B illustrate examples of information input through data input/output lines shown in FIG. 4.
Figure 5B:

FIGS. 5A and 5B are diagrams illustrating an example of commands, addresses, and data, which are input through data input/output lines shown in FIG. 4. For example, FIG. 5A represents flow of a first command CMD1, a first address ADDR1, first data DATA1, and a second command CMD2 sequentially input through the data input/output lines DQ shown in FIG. 4. FIG. 5B represents flow of a third command CMD3, a second address ADDR2, and a fourth command CMD4 which are sequentially input through the data input/output lines DQ shown in FIG. 4.

Referring to FIG. 5A, the first command CMD1 may be a setup command representing a method for programming data received from the memory controller (e.g., 200 shown in FIG. 1). Any one method among a Single Level Cell (SLC) method, a Multi-Level Cell (MLC) method, a Triple Level Cell (TLC) method, and a Quadruple Level Cell (QLC) method and/or any one program method among a page program method, a multi-plane program method, and a cache program method may be determined based on the setup command.

The first address ADDR1 may be received next to the first command CMD1 through the data input/output lines DQ. The first address ADDR1 may include a column address and a row address, e.g., the first address ADDR1 may represent a page buffer in which data transferred from the memory controller (e.g., 200 shown in FIG. 1) is to be temporarily stored and a memory area in which the data stored in the page buffer is to be stored. The memory area in which the data is to be stored may be any one of the memory blocks BLK1 to BLKz included in the memory cell array (e.g., 110 shown in FIG. 2).

In an embodiment, the memory device (e.g., 100 shown in FIG. 2) may sequentially receive the column address and the row address included in the first address ADDR1. A page buffer included in the page buffer group (e.g., 123 shown in FIG. 2) or a specific column of the memory cell array (e.g., 110 shown in FIG. 2) may be determined based on the received column address. A memory area or memory block in which data stored in the page buffer is to be stored may be determined based on the received row address.

The first data DATA1 received next to the first address ADDR1 through the data input/output lines DQ may be data to be stored or programmed in the memory cell array (e.g., 110 shown in FIG. 2). The first data DATA1 may be temporarily stored in one buffer among the page buffers included in the page buffer group (e.g., 123 shown in FIG. 2) and then programmed in a memory area determined corresponding to the row address.

The second command CMD2 received next to the first data DATA1 through the data input/output lines DQ may be a confirm command. The confirm command may be a command indicating initiation of an operation corresponding to a command determined by the setup command. Therefore, when the memory device (100 shown in FIG. 2) receives the confirm command, the memory device (100 shown in FIG. 2) may program the first data DATA1 transferred from the memory controller (200 shown in FIG. 1) in any one memory area among a plurality of memory areas.

Referring to FIG. 5B, the third command CMD3 may be a setup command representing a method for reading data programmed in the memory device (100 shown in FIG. 2). For example, any one read method among a page read method, a cache read method, a plane read method, and a multi-plane read method may be determined based on the setup command.

The second address ADDR2 may be received next to the third command CMD3 through the data input/output lines DQ. Like the first address ADDR1, the second address ADDR2 may include a column address and a row address. For example, the second address ADDR2 may represent a position of a specific memory cell among the memory cells included in the memory cell array (110 shown in FIG. 2).

In an embodiment, the memory device (100 shown in FIG. 2) may sequentially receive the column address and the row address, which are included in the second address ADDR2. A page buffer included in the page buffer group (123 shown in FIG. 2) or a specific column of the memory cell array (110 shown in FIG. 2) may be determined based on the received column address. A memory area or memory block in which data stored in the page buffer is to be stored may be determined based on the received row address.

The fourth command CMD4 received next to the second address ADDR2 through the data input/output lines DQ may be a confirm command. The confirm command may be a command indicating initiation of an operation corresponding to a command determined by the setup command. Therefore, when the memory device (100 shown in FIG. 2) receives the confirm command, the memory device (100 shown in FIG. 2) may read data stored in a memory cell specified by the second address ADDR2 and output the read data to the memory controller (200 shown in FIG. 1).

In an embodiment, the column address and the row address, which are included in each of the first address ADDR1 and the second address ADDR2 of in FIGS. 5A and 5B, may be addressed in units of a byte. For example, each of the first address ADDR1 and the second address ADDR2 may be an address of a page unit.

However, when the memory device (100 shown in FIG. 2) has a high capacity, the bit number used to indicate an address may be increased. Therefore, the period (cycle) of an address input to the memory device (100 in FIG. 2) and/or an addressing unit of the address may be changed. An addressing method of a column address and a row address, which are included in the address will be described in more detail with reference to FIGS. 6A to 8.

Figures 6A, 6B:
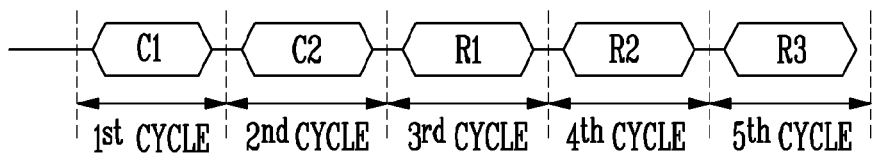
FIGS. 6A and 6B illustrate a method for inputting an address shown in FIGS. 5A and 5B.

FIGS. 6A and 6B are diagrams illustrating a method for inputting the address shown in FIGS. 5A and 5B. FIG. 6A illustrates an address actually input when the first address ADDR1 or the second address ADDR2 (shown in FIGS. 5A and 5B) is input. FIG. 6B illustrates bits input through actual input/output lines DQ in each cycle of FIG. 6A. A case where the input/output lines DQ shown in FIG. 4 are configured with eight input/output lines of DQ0 to DQ7 is shown. Also, a case where FIGS. 6A and 6B illustrate an address when the capacity of the memory device (100 shown in FIG. 2) is 1 Tb.

Referring to FIGS. 5A, 5B and FIG. 6A, the first address ADDR1 or the second address ADDR2 (shown in FIGS. 5A and 5B) may be input during five periods (or five cycles). In an embodiment, if a page is generated in a 16-Kb unit and a spare is generated in a 2-Kb unit when the capacity of the memory device (100 shown in FIG. 2) is 1 Tb, 15-bit data may be required to express a column address COLUMN ADDR (e.g., A[14:0]=100111101010111), and 23-bit data may be required to express a row address ROW ADDR (e.g., A[16:39]=10101001101110100111011).

Therefore, a portion C1 of the column address COLUMN ADDR included in the address may be input during a first cycle $1^{st}$ CYCLE (e.g., 10011110), and the other C2 of the column address COLUMN ADDR may be input during a second cycle $2^{nd}$ CYCLE (e.g., 1010111). In addition, a portion R1 of the row address ROW ADDR included in the address may be input during a third cycle $3^{rd}$ CYCLE (e.g., 10101001), another portion R2 of the row address ROW ADDR may be input during a fourth cycle $4^{th}$ CYCLE (e.g., 11011101), and the other R3 of the row address ROW ADDR may be input during a fifth cycle $5^{th}$ CYCLE (e.g., 00111011).

Referring to FIGS. 6A and 6B, the column address COLUMN ADDR may be input through the input/output lines DQ0 to DQ7 during the first and second cycles $1^{st}$ CYCLE and $2^{nd}$ CYCLE. For example, after A0, A1, A2, A3, A4, A5, A6, and A7 are respectively input through DQ0, DQ1, DQ2, DQ3, DQ4, DQ5, DQ6, and DQ7 during the first cycle $1^{st}$ CYCLE, A8, A9, A10, A11, A12, A13, and A14 may be respectively input through DQ0, DQ1, DQ2, DQ3, DQ4, DQ5, DQ6, and DQ7 during the second cycle $2^{nd}$ CYCLE. Each of A0 to A14 A[14:0] may be '0' or '1.'

In an embodiment, in the second cycle $2^{nd}$ CYCLE, data input through DQ7 may be input to distinguish the column address COLUMN ADDR and the row address ROW ADDR from each other. Alternatively, the data input through DQ7 may not exist.

Referring to FIGS. 6A and 6B, the row address ROW ADDR may be input through the input/output lines DQ0 to DQ7 during the third to fifth cycles $3^{rd}$ CYCLE to $5^{th}$ CYCLE. For example, A16 to A24 A[24:16] which are bits representing a position of a specific word line WORD LINE may be input through the input/output lines DQ0 to DQ7 during the third and fourth cycles $3^{rd}$ CYCLE and $4^{th}$ CYCLE, A25 and A26 A[26:25] which are bits representing a position of a specific plane PLANE may be input through the input/output lines DQ0 to DQ7 during the fourth cycle $4^{th}$ CYCLE, and A27 to A36 A[36:27] which are bits representing a position of a specific memory block BLOCK and A37 to A39 A[39:37] which are bits representing a position of a logical unit device LUN may be input through the input/output lines DQ0 to DQ7 during the fourth and fifth cycles $4^{th}$ CYCLE and $5^{th}$ CYCLE. Each of A16 to A39 A[39:16] may be '0' or '1.'

Referring to FIGS. 6A and 6B, if the address received from the memory controller (200 shown in FIG. 1) is addressed in a 1-byte unit, when the capacity of the memory device (100 shown in FIG. 2) is 1 Tb, 15-bit data may be required to express the column address COLUMN ADDR, and 23-bit data may be required to express the row address ROW ADDR.

For example, all bits A[39:16] input during the third to fifth cycle 3rd CYCLE to $5^{th}$ CYCLE may be used to express the row address ROW ADDR when the capacity of the memory device (100 shown in FIG. 2) is 1 Tb. That is, an address of the memory device (100 shown in FIG. 2) having the capacity of 1 Tb cannot be expressed through the address input during three cycles of the third to fifth cycle $3^{rd}$ CYCLE to $5^{th}$ CYCLE.

Therefore, when the capacity of the memory device (100 shown in FIG. 2) gradually increases to 2 Tb and 4 Tb, a corresponding address cannot be expressed through the bits input during the third to fifth cycle 3rd CYCLE to $5^{th}$ CYCLE, and hence the cycle in which the row address ROW ADDR is input may be increased.

Further, an address transmitted from the memory controller (200 shown in FIG. 1) to the memory device (100 shown in FIG. 2) is to be input during the first to fifth cycles $1^{st}$ CYCLE to $5^{th}$ CYCLE (e.g., within five cycles). Therefore, the cycle in which the column address COLUMN ADDR is input may be decreased when the cycle in which the row address ROW ADDR is input is increased. Accordingly, additionally, the column address COLUMN ADDR may be addressed in a 512-byte unit, instead of the 1-byte unit, so as to input the column address COLUMN ADDR in the decreased cycle.

Figures 7A, 7B:
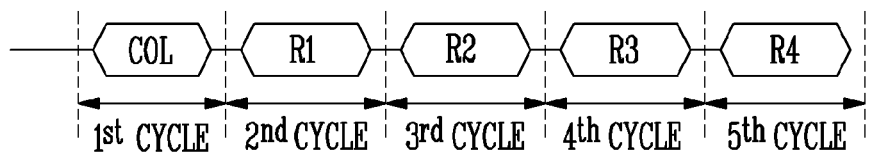
FIGS. 7A and 7B illustrate an embodiment of a method for inputting an address as shown in FIGS. 5A and 5B according to the present disclosure.

FIGS. 7A and 7B are diagrams illustrating embodiments of a method for inputting the address shown in FIGS. 5A and 5B in accordance with the present disclosure. Referring to FIGS. 7A and 7B, FIG. 7A illustrates an address actually input when an address addressed in a 512-byte unit, and FIG. 7B illustrates bits input through actual input/output lines DQ in each cycle. The case where the input/output lines DQ shown in FIGS. 7A and 7B are configured with eight input/output lines of DQ0 to DQ7 is shown. Also, the case where FIGS. 7A and 7B illustrate an address when the capacity of the memory device (100 shown in FIG. 2) exceeds 1 Tb is shown.

Referring to FIGS. 6A, 6B, 7A and 7B, like FIGS. 6A and 6B, FIGS. 7A and 7B illustrate an address input during five periods (or cycles). However, unlike FIGS. 6A and 6B, FIGS. 7A and 7B illustrate that a column address COLUMN ADDR is input during only a first cycle $1^{st}$ CYCLE. For example, according to an embodiment, when the column address COLUMN ADDR is addressed in a 512-byte unit, the column address COLUMN ADDR may be input through the input/output lines DQ0 to DQ7 during only the first cycle $1^{st}$ CYCLE.

In an embodiment, when an operation to be performed in the memory device (100 shown in FIG. 1), according to a request received from the host (300 shown in FIG. 1) or an internal operation of the memory controller (200 shown in FIG. 1), is a program operation, a read operation, or an erase operation, the flash translation layer (210 shown in FIG. 1) may generate a column address in the 512-byte unit based on a logic block address (LBA) received from the host (300 shown in FIG. 1). When the column address is generated in the 512-byte unit, the column address may be expressed with 8 bits. Therefore, the column address COLUMN ADDR included in the address may be input during the first cycle $1^{st}$ CYCLE. In addition, row addresses R1 to R4 may be input during the other second to fifth cycles $2^{nd}$ CYCLE to $5^{th}$ CYCLE.

Referring to FIGS. 7A and 7B, the column address COLUMN ADDR may be input through the input/output lines DQ0 to DQ7 during the first cycle $1^{st}$ CYCLE. The input column address COLUMN ADDR may be generated in the 512-byte unit. For example, A0 to A7 may be input through the input/output lines DQ0 to DQ7 during the first cycle $1^{st}$ CYCLE. Each of A0 to A7 A[7:0] may be '0' or '1.'

Referring to FIGS. 7A and 7B, a row address ROW ADDR may be input through the input/output lines DQ0 to DQ7 during the second to fifth cycles $2^{nd}$ CYCLE to $5^{th}$ CYCLE. That is, unlike the row address input in FIGS. 6A and 6B, the row address ROW ADDR to which one cycle is added may be input. For example, A8 to A24 A[24:8], which are bits representing a position of a specific word line WORD LINE, may be input through the input/output lines DQ0 to DQ7 during the second to fourth cycles $2^{nd}$ CYCLE to $4^{th}$ CYCLE, A25 and A26 A[26:25], which are bits representing a position of a specific plane PLANE, may be input through the input/output lines DQ0 to DQ7 during the fourth cycle $4^{th}$ CYCLE, and A27 to A36 A[36:27] which are bits representing a specific memory block BLOCK and A37 to A39 A[39:37] which are bits representing a position of a logical unit device LUN may be input through the input/output lines DQ0 to DQ7 during the fourth and fifth cycle $4^{th}$ CYCLE and $5^{th}$ CYCLE. Each of A8 to A39 A[39:16] may be '0' or '1.'

A case where the bits representing the position of the word line WORD LINE are extended is illustrated. However, in another embodiment, the bits representing the positions of the plane PLANE, the memory block BLOCK, or the logical unit device LUN may be extended. In still another embodiment, the bits representing the word line WORD LINE, the plane PLANE, the memory block BLOCK, or the logical unit device LUN may be flexibly changed.

FIG. 8 is a diagram illustrating one type of method for addressing a column address. Referring to FIG. 8, first to seventh columns shown in FIG. 8 represent bits used to express a column address COLUMN ADDR (e.g., A0 to A7 input through the input/output lines DQ0 to DQ7). An eighth column represents a range in which an address can be expressed in byte addressing BYTE ADDRESSING of the 1-byte unit in the method. A ninth column represents a range in which an address can be expressed in sector addressing SECTOR ADDRESSING or block addressing BLOCK ADDRESSING of the 512-byte unit in accordance with the present disclosure. In FIG. 8, each of A0 to A7 may be '0' or '1.'

In an embodiment, the address expressed with A1 to A7 may be changed depending on the byte addressing BYTE ADDRESSING and the block addressing BLOCK ADDRESSING. For example, in the byte addressing BYTE ADDRESSING, the address sequentially increases by 1 byte (0, 1, 2, . . . ). In addition, since the address sequentially increases by 1 byte, an address which can be expressed once by A1 to A7 input through the input/output lines DQ0 to DQ7 is 255 bytes. Further, an address which can be expressed once by A1 to A7 input during two cycles is 65536 bytes. Therefore, when a page is generated in a 16-Kb unit and a spare is generated in a 2-Kb unit, an address is to be input during two cycles to express the column address.

However, in the block addressing BLOCK ADDRESSING, the address sequentially increases by 512 bytes (0, 512, 1024, . . . ). In addition, since the address sequentially increases by 512 bytes, an address which can be expressed once by A1 to A7 input through the input/output lines DQ0 to DQ7 is 130560 bytes. Therefore, unlike the byte addressing BYTE ADDRESSING, according to the block addressing BLOCK ADDRESSING, the page of the 16-Kb unit and the spare of the 2-Kb unit can be sufficiently expressed by A1 to A7 input during one cycle. That is, according to the block addressing BLOCK ADDRESSING, the column address can be expressed by using only an address input during one cycle.

Consequently, in accordance with an embodiment of the present disclosure, the column address COLUMN ADDR may be input during one cycle such that the row address ROW ADDR is input during four cycles among the five cycles in which the address is input. Also, a column address may be addressed according to the block addressing BLOCK ADDRESSING of the 512-byte unit, such that the column address COLUMN ADDR is input during one cycle. When a column address is addressed according to the block addressing BLOCK ADDRESSING, all column addresses may be input during one cycle.

Figure 9:
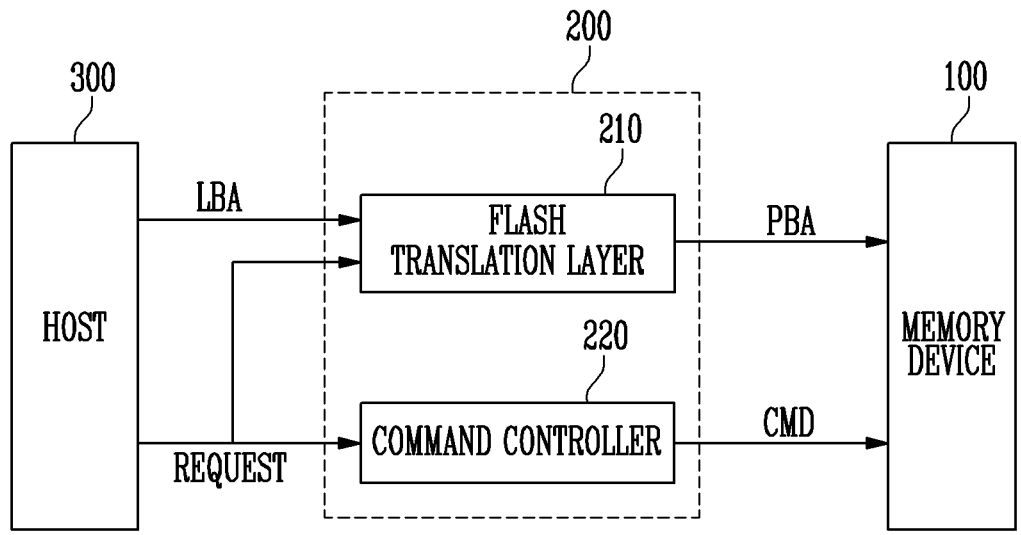
FIG. 9 illustrates an embodiment of a memory controller according to the present disclosure.

FIG. 9 is a diagram illustrating an embodiment of memory 200 controller, which may include a flash translation layer 210 and a command generator 220. The flash translation layer 210 may receive a logical block address (LBA) together with a request REQUEST from the host 300. The request REQUEST received from the host 300 may be any one of a program request, a read request, and an erase request. Therefore, the LBA received together with the REQUEST received from the host 300 may correspond to any one of the program request, read request, and the erase request.

In an embodiment, the flash translation layer 210 may translate the LBA into a physical block address (PBA) and output the PBA to the memory device 100. The LBA is addressed in a sector unit, and the memory device 100 performs an operation in a page unit or memory block unit. Hence, the LBA may be translated into the PBA such that the memory device 100 performs an operation.

The PBA output from the flash translation layer 210 may be input to the memory device 100 through the input/output lines DQ during five cycles. A column address may be input during two cycles among the five cycles, and a row address may be input during three cycles among the five cycles. However, when the capacity of the memory device 100 increases, a bit number for expressing an address of the memory device 100 may increase. For example, when the capacity of the memory device 100 increases, a bit number for expressing the row address may increase.

Therefore, when the capacity of the memory device 100 increases, the LBA may be addressed as the PBA such that the column address is input during only one cycle among the five cycles in which the PBA is input, and the row address is input during the other four cycles. For example, a larger number of bits may be allocated to express the row address, and the row address may be input during four cycles increased from the existing three cycles in accordance with an embodiment. In addition, since the column address is to be input during one cycle instead of the existing two cycles, the column address may be addressed in a 512-byte unit.

In the present embodiment, when an operation to be performed in the memory device 100 is determined according to the request REQUEST received from the host 300 or an internal operation of the memory controller 200, an addressing unit of the column address and a period in which the column address and the row address are input may be set according to the corresponding operation. For example, when the operation to be performed in the memory device 100 according to the request REQUEST received from the host 300 or the internal operation of the memory controller 200 is a program operation, a read operation, or an erase operation, the flash translation layer 210 may generate a column address of a 512-byte unit based on the LBA received from the host 300. In addition, the column address of the 512-byte unit may be input to the memory device 100 during one cycle among the five cycles in which the address is input, and a row address of a 1-byte unit may be input to the memory device during four cycles among the five cycles.

In an embodiment, when the operation to be performed in the memory device 100 according to the request REQUEST received from the host 300 or the internal operation of the memory controller 200 is the program operation, the read operation, or the erase operation, the command controller 220 may generate a command different from that corresponding to the existing program operation, the existing read operation, or the erase operation. For example, command controller 220 may generate a command representing that a column address corresponding to the corresponding operation is to be translated in the 512-byte unit. Therefore, the memory device 100 may identify whether the column address is addressed in the 1-byte unit or the 512-byte unit, based on the command generated by the command controller 220, and perform the corresponding operation.

However, when the operation to be performed in the memory device 100 according to the request REQUEST received from the host 300 or the internal operation of the memory controller 200 is not the program operation, the read operation, or the erase operation, the command controller 220 may generate the same command as the existing command and output the generated command to the memory device 100. For example, when the operation to be performed in the memory device 100 according to the request REQUEST received from the host 300 or the internal operation of the memory controller 200 is an operation of accessing a register, such as a status read operation (Status Read) or a register value setting or read operation (Set/Get Feature), addressing may be performed by using the same method as the existing method, generate the same command as the existing command, and output the generated command to the memory device 100.

Figure 10:
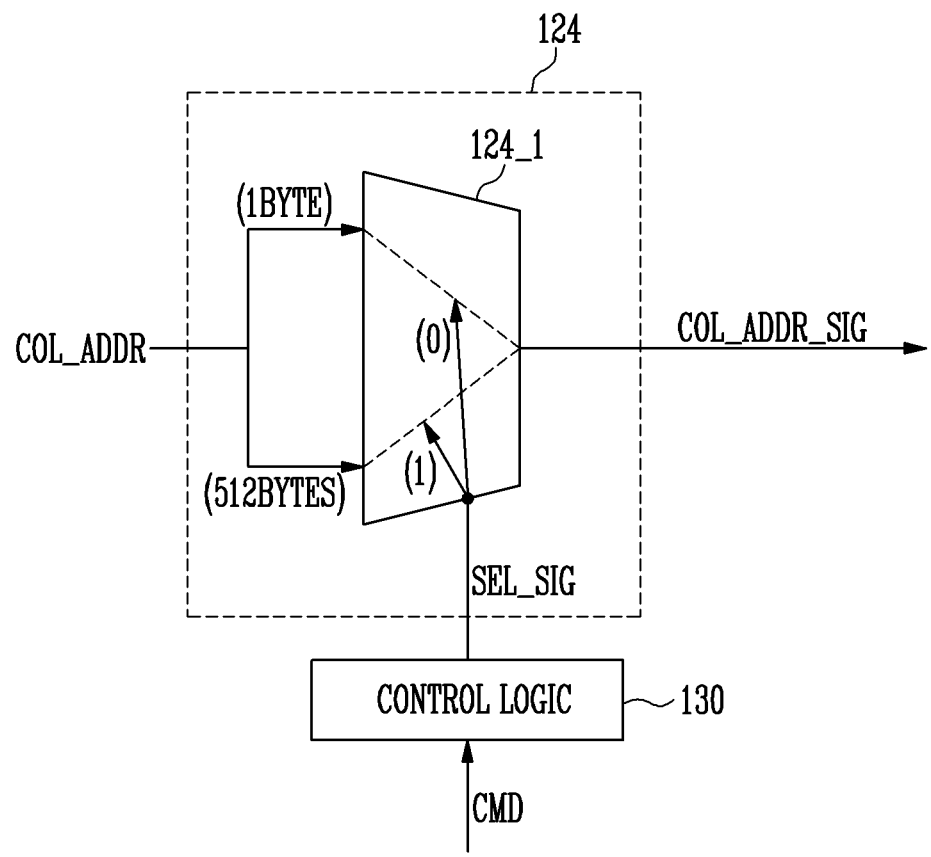
FIG. 10 illustrates an embodiment of a column decoder according to the present disclosure.

FIG. 10 is a diagram illustrating an embodiment of an operation performed by the column decoder in the memory device shown in FIG. 2. Referring to FIGS. 2 and 10, the column decoder 124 may include a multiplexer 124_1 which outputs a column address signal COL_ADDR_SIG, based on a column address COL_ADDR. The column address signal COL_ADDR_SIG may be a signal for specifying any one of the plurality of page buffers PB1 to PBn included in the page buffer group (e.g., 123 shown in FIG. 2) or specifying any one of the column lines CL of the memory cells included in the memory cell array (e.g., 110 shown in FIG. 2).

In an embodiment, the column decoder 124 may decode a column address COL_ADDR included in an address received from the memory controller (200 shown in FIG. 1). The column address COL_ADDR may be decoded (addressed) in a 1-byte unit or a 512-byte unit. According to whether the unit of the column address COL_ADDR is the 1-byte unit or the 512-byte unit, a first line or a second line of the multiplexer 124_1 may be selected, and the column address COL_ADDR may be input through the corresponding line. For example, when an operation to be performed in the memory device 100 according to a request received from the host 300 or an internal operation of the memory controller 200 is a program operation, a read operation, or an erase operation, the column address COL_ADDR may be decoded in the 512-byte unit, and be decoded in the 1-byte unit in other cases.

In an embodiment, the column decoder 124 may receive a selection signal SEL_SIG from the control logic (130 shown in FIG. 2). The control logic 130 may generate a selection signal SEL_SIG based on a command received from the memory controller (200 shown in FIG. 2). For example, when the command received from the memory controller (200 shown in FIG. 1) represents that the column address COL_ADDR is addressed in the 512-byte unit, the control logic 130 may generate and output a selection signal SEL_SIG of '1,' based on the command received from the memory controller (200 shown in FIG. 1).

For example, the selection signal SEL_SIG representing that the column address COL_ADDR has been addressed in the 512-byte unit may be output from the control logic 130, and the column address COL_ADDR received from the memory controller (200 shown in FIG. 1) based on the selection signal SEL_SIG, may be decoded in the 512-byte unit.

In another example, when the command received from the memory controller 200 shown in FIG. 1) represents that the column address COL_ADDR is addressed in the 1-byte unit, the control logic 130 may generate and output a selection signal SEL_SIG, based on the command received from the memory controller (200 shown in FIG. 1). For example, the selection signal SEL_SIG representing that the column address COL_ADDR is addressed in the 1-byte unit may be output from the control logic 130, and the column address COL_ADDR received from the memory controller (200 shown in FIG. 1), based on the selection signal SEL_SIG, may be decoded in the 1-byte unit.

In an embodiment, the selection signal SEL_SIG representing that the column address COL_ADDR has been addressed in the 512-byte unit is '1.' However, in another embodiment, the selection signal SEL_SIG representing that the column address COL_ADDR has been addressed in the 512-byte unit may be '0.'

In an embodiment, the multiplexer 124_1 may output a column address signal COL_ADDR_SIG based on the column address COL_ADDR and the selection signal SEL_SIG. For example, when the selection signal SEL_SIG is '1,' the multiplexer 124_1 may output a column address signal COL_ADDR_SIG representing that the column address COL_ADDR received from the memory controller (200 shown in FIG. 2) is a column address COL_ADDR addressed in the 512-byte unit. Thus, the multiplexer 124_1 may output the column address signal COL_ADDR_SIG decoded in the 512-byte unit.

However, when the selection signal SEL_SIG is '0,' the multiplexer 124_1 may output a column address signal COL_ADDR_SIG representing that the column address COL_ADDR received from the memory controller (200 shown in FIG. 2) is a column address COL_ADDR addressed in the 1-byte unit. Thus, the multiplexer 124_1 may output the column address signal COL_ADDR_SIG decoded in the 1-byte unit.

In an embodiment, the multiplexer 124_1 is expressed in a switching form. In various embodiments, the multiplexer 124_1 may include a plurality of transistors and/or resistors.

Consequently, the memory device 100 performs an operation based on the column address signal COL_ADDR_SIG output from the column decoder 124 and may perform an operation on an area specified according to an addressing unit represented by the column address signal COL_ADDR_SIG.

Figure 11:
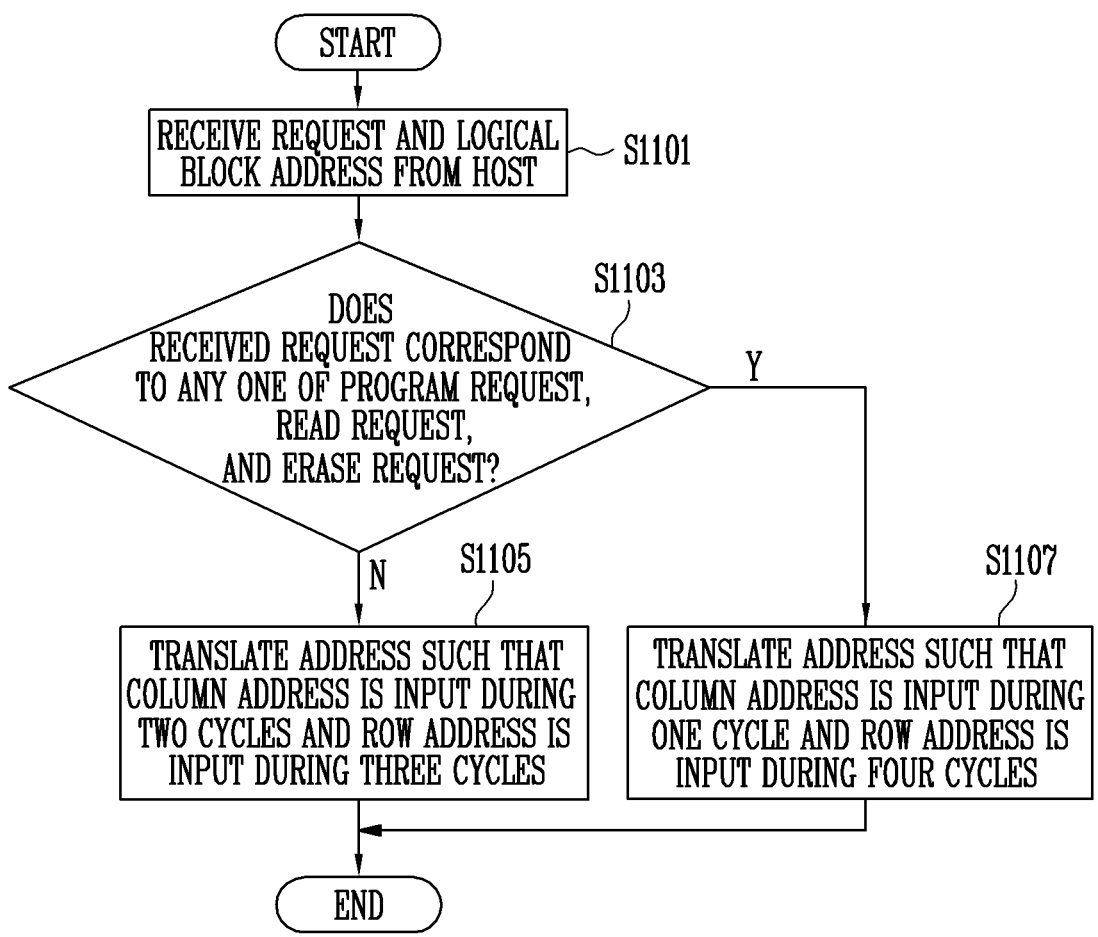
FIG. 11 illustrates an embodiment of a method performed by the memory controller according to the present disclosure.

FIG. 11 is a diagram illustrating an embodiment of an operation performed by the memory controller in accordance with an embodiment of the present disclosure. Referring to FIG. 11, in S1101, the memory controller may receive a request and a logic block address from the host. The request received from the host may be a program request, a read request, or an erase request. Alternatively, the request received from the host is a request except the program request, the read request, or the erase request, and may be a request corresponding to an operation of accessing a register, such as a status read operation (Status Read) or a register value setting or read operation (Set/Get Feature). In an embodiment, the logical block address received from the host may be an address corresponding to the request received from the host.

In S1103, the memory controller may determine whether the request received from the host corresponds to any one of the program request, the read request, or the erase request. When the request received from the host corresponds to any one of the program request, the read request, or the erase request, the memory controller proceeds to operation S1107. When the request received from the host does not correspond to any one of the program request, the read request, or the erase request, the memory controller proceeds to operation S1105.

When the request received from the host is not any one of the program request, the read request, or the erase request (N), the memory controller may translate an address by allowing five cycles in which the address is input to be equal to the existing cycles. For example, the logical block address may be translated into a physical block address such that a column address is input during two cycles among the five cycles and a row address is input during the other three cycles (S1105).

However, when the request received from the host is the program request, the read request, or the erase request (Y) (e.g., when the request received from the host is a request corresponding to the operation of accessing a register, such as a status read operation (Status Read) or a register value setting or read operation (Set/Get Feature)), the memory controller may translate the address by changing a cycle in which the address is input and a unit in which the column address is addressed.

For example, when the request received from the host is a program request, read request, or erase request, the memory controller may translate the logical block address into a physical block address such that the column address is input during one cycle among the five cycles in which the address is input and the row address is input during the other four cycles (S1107). Since the column address is to be input during one cycle, the column address may be addressed in the 512-byte unit.

Figure 12:
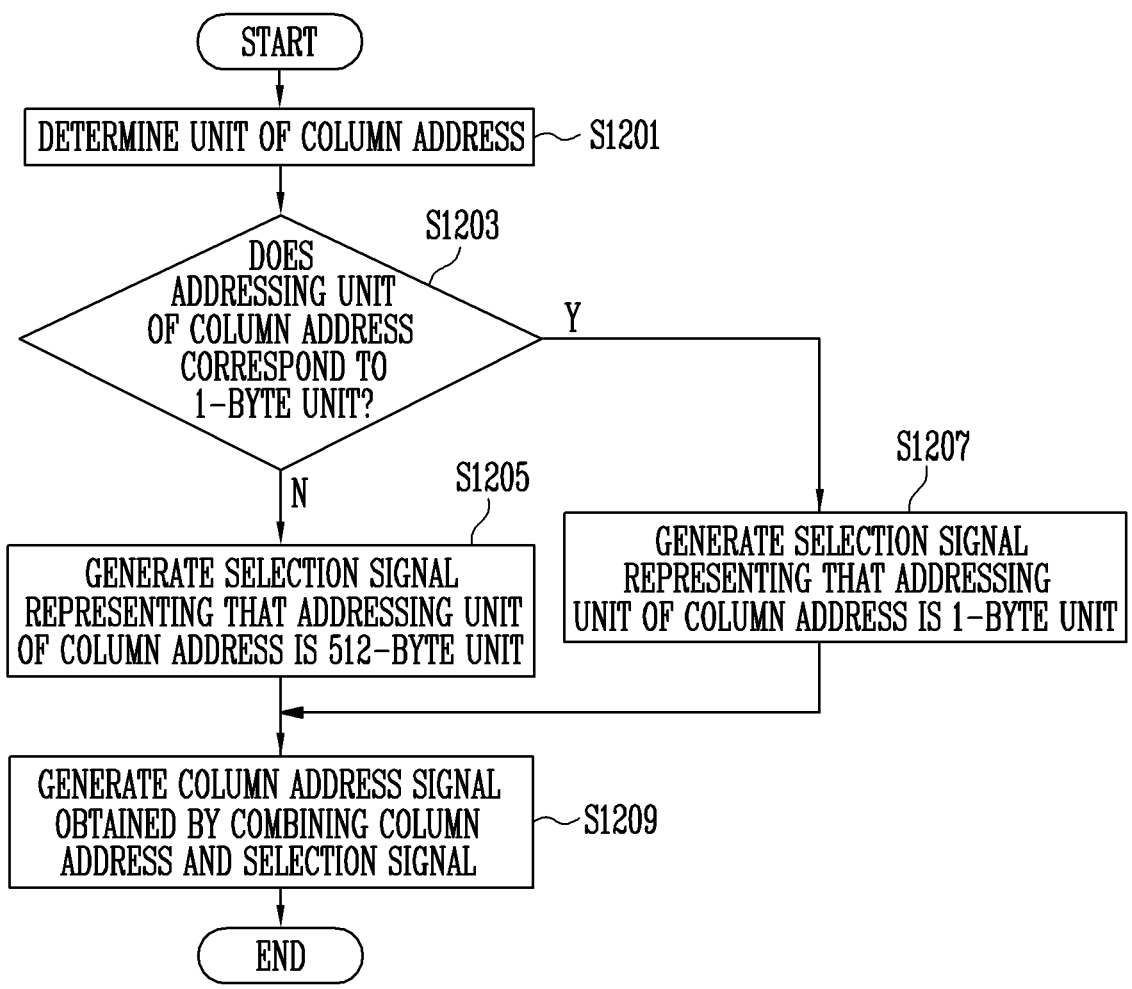
FIG. 12 illustrates an embodiment of a method for operating a memory device according to the present disclosure.

FIG. 12 is a diagram illustrating an operation performed by the memory device in accordance with an embodiment of the present disclosure. Referring to FIG. 12, in S1201, the memory device may determine a unit of a column address included in an address received from the external controller. In an embodiment, when a request received from the host is any one of a program request, a read request, or an erase request, the column address may be addressed in a 1-byte unit. When the request received from the host is not any one of the program request, the read request, or the erase request, the column address is addressed by a 512-byte unit. Hence, the units of the addressed column address may be distinguished from each other.

In S1203, the memory device may determine whether an addressing unit of the column address included in the address translated into a physical block address is the 1-byte unit. When the addressing unit of the column address is the 1-byte unit, the memory device proceeds to operation S1207. When the addressing unit of the column address is not the 1-byte unit (that is, when the addressing unit of the column address is the 512-byte unit), the memory device proceeds to operation S1205.

In S1205, the memory device may generate a selection signal representing the addressing unit of the column address is the 512-byte unit. The selection signal may be '1.' Subsequently, the memory device may generate a column address signal obtained by combining the column address and the selection signal of '1' (S1209). The generated column address signal may represent that the column address is addressed in the 512-byte unit, and simultaneously specify a specific page buffer and any one of the column lines of the memory cell array.

In S1207, the memory device may generate a selection signal representing that the addressing unit of the column address is the 1-byte unit. The selection signal may be '0.' Subsequently, the memory device may generate a column address signal obtained by combining the column address and the selection signal of '0' (S1209). The generated column address signal may represent that the column address is addressed in the 1-byte unit, and simultaneously specify a specific page buffer and any one of the column lines of the memory cell array.

Figure 13:
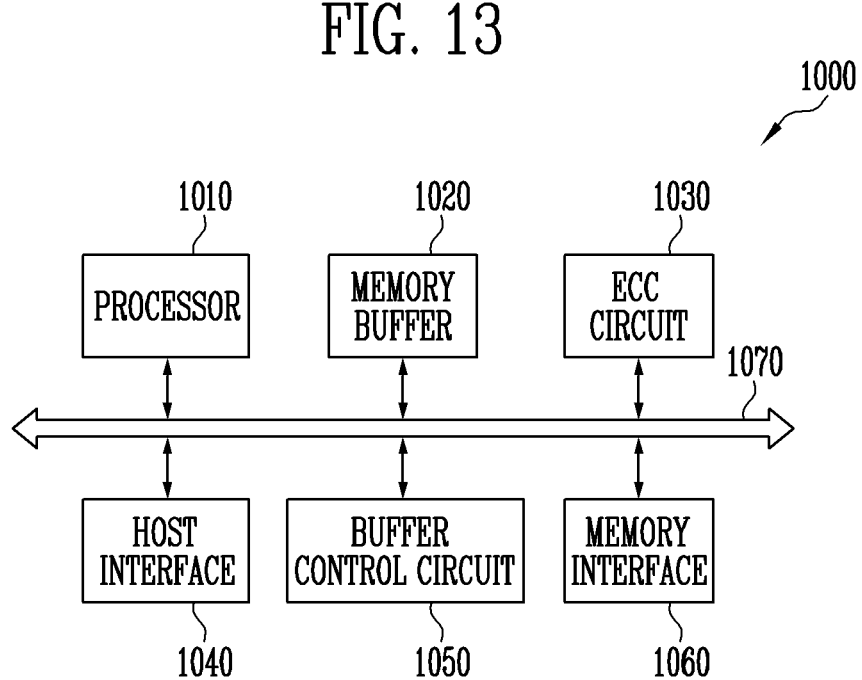
FIG. 13 illustrates an embodiment of a memory controller according to the present disclosure.

FIG. 13 is a diagram illustrating an embodiment of a memory controller 1000, which corresponds to the memory controller shown in FIG. 1. Referring to FIG. 13, memory controller 1000 is coupled to a host and a memory device, and is configured to access the memory device in response to a request received from the host. For example, the memory controller 1000 may be configured to control read, program, erase, and background operations of the memory device. The memory controller 1000 may also be configured to provide an interface between the memory device and the host and to drive firmware or other instructions for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory or a buffer memory.

The processor 1010 may perform a function of a flash translation layer (FTL), e.g., may translate a logical block address (LBA) provided by the host through the FTL into a physical block address (PBA). The FTL may receive an LPA, using a mapping table, to be translated into a PBA. Several address mapping methods of the FTL exist according to mapping units. A representative address mapping method includes a page mapping method, a block mapping method, and a hybrid mapping method.

In an embodiment, the processor 1010 may translate a logical block address (LBA) into a physical block address (PBA), based on a request received from the host (300 shown in FIG. 1). For example, when the request received from the host (300 shown in FIG. 1) is a program request, a read request, or an erase request, the processor 1010 may address the LBA in a 512-byte unit. For example, a column address among addresses included in the PBA may be addressed in the 512-byte unit.

Further, the processor 1010 may output a column address to the memory device (100 shown in FIG. 1) during only one cycle among five cycles in which an address is input, and may output a row address to the memory device (100 shown in FIG. 1) during the other four cycles. For example, since the column address is addressed in the 512-byte unit, the processor 1010 may input the column address during only one cycle. In addition, since a bit number for expressing the row address is increased, the processor 1010 may output the increased bit number to the memory device (100 shown in FIG. 1) during four cycles.

In an embodiment, when the request received from the host (300 shown in FIG. 1) is the program request, the read request, or the erase request, the processor 1010 may generate a command representing that the LBA is to be addressed in the 512-byte unit. For example, the processor 1010 may generate a new command representing that the column address is to be addressed in the 512-byte unit (instead of a command corresponding to the existing program request, the existing read request, or the existing erase request) and may output the generated new command to the memory device (100 shown in FIG. 1). In an embodiment, the memory device (100 shown FIG. 1) may perform an operation corresponding to the new command by determining the addressing unit is the 1-byte unit or the 512-byte unit, based on the command.

In an embodiment, the processor 1010 may be configured to randomize data received from the host. For example, the processor 1010 may randomize data received from the host using a randomizing seed. The randomized data is provided as data to be stored to the memory device to be programmed in the memory cell array. The processor 1010 may perform randomizing and derandomizing by driving software or firmware.

The memory buffer 1020 may be used as the working memory, the cache memory, or the buffer memory of the processor 1010. The memory buffer 1020 may store codes and commands which are executed by the processor 1010. The memory buffer 1020 may store data processed by the processor 1010. The memory buffer 1020 may include a Static RAM (SRAM) or a Dynamic RAM (DRAM).

The ECC circuit 1030 may perform an ECC operation. For example, the ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, for example, through one or more of a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate commands, addresses, and data with the memory device through one or more channels. In an example, the memory controller 1000 may not include the memory buffer 1020 and the buffer control circuit 1050.

In an embodiment, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

The bus 1070 of the memory controller 1000 may, for example, be divided into a control bus and a data bus. The data bus may be configured to transmit data in the memory controller 1000. The control bus may be configured to transmit control information such as a command and an address in the memory controller 1000. The data bus and the control bus may be separated from each other and may not interfere or influence with each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 14:
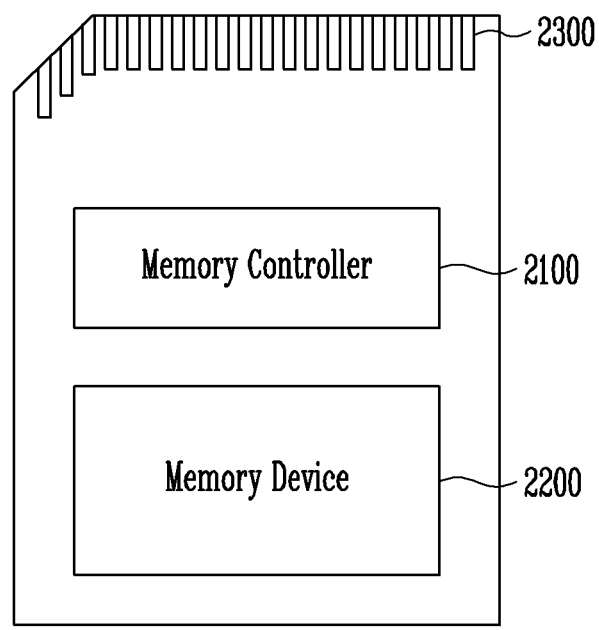
FIG. 14 illustrates an embodiment of a memory card system.

FIG. 14 illustrates an embodiment of a memory card system 2000 to which any of the embodiments of the storage device may be applied. Referring to FIG. 14, memory card system 2000 includes a memory controller 2100, a memory device 2200, and a connector 2300.

The memory controller 2100 is coupled to the memory device 2200 and is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to drive firmware or other instructions for controlling the memory device 2200. The memory device 2200 may be implemented identically to the memory device 100 (100 shown in FIG. 1).

In an example, the memory controller 2100 may include components such as a Random Access Memory (RAM), a processing unit, a host interface, a memory interface, and an error corrector. The memory controller 2100 may communicate with an external device through the connector 2300. The memory controller 2100 may communicate with the external device (e.g., the host) according to a specific communication protocol. In an example, the memory controller 2100 may communicate with the external device through at least one communication protocol. Examples of communication protocols include a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

The memory device 2200 may be implemented, for example, as a nonvolatile memory device. Examples include an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

In an embodiment, the memory controller 2100 may translate a logical block address (LBA) into a physical block address (PBA) based on a request received from the host (300 shown in FIG. 1). For example, when the request received from the host (300 shown in FIG. 1) is a program request, a read request, or an erase request, the memory controller 2100 may address the LBA in a 512-byte unit. For example, a column address among addresses in the PBA may be addressed in the 512-byte unit.

Further, the memory controller 2100 may output a column address to the memory device 2200 during only one cycle among five cycles in which an address is input, and may output a row address to the memory device 2200 during the other four cycles. For example, since the column address is addressed in the 512-byte unit, the memory controller 2100 may input the column address during only one cycle. In addition, since a bit number for expressing the row address is increased, the memory controller 2100 may output the increased bit number to the memory device 2200 during four cycles.

In an embodiment, when the request received from the host (300 shown in FIG. 1) is the program request, the read request, or the erase request, the memory controller 2100 may generate a command representing that the LBA is to be addressed in the 512-byte unit. For example, the memory controller 2100 may generate a new command representing that the column address is to be addressed in the 512-byte unit, instead of a command corresponding to the existing program request, the existing read request, or the existing erase request, and output the generated new command to the memory device 2200.

In an embodiment, the memory device 2200 may perform an operation corresponding to the new command by determining the addressing unit is the 1-byte unit or the 512-byte unit based on the command.

The memory controller 2100 and the memory device 2200 may be integrated into a single semiconductor device to constitute a memory card. For example, the memory controller 2100 and the memory device 2200 may constitute a memory card. Examples of the memory card include a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 15:
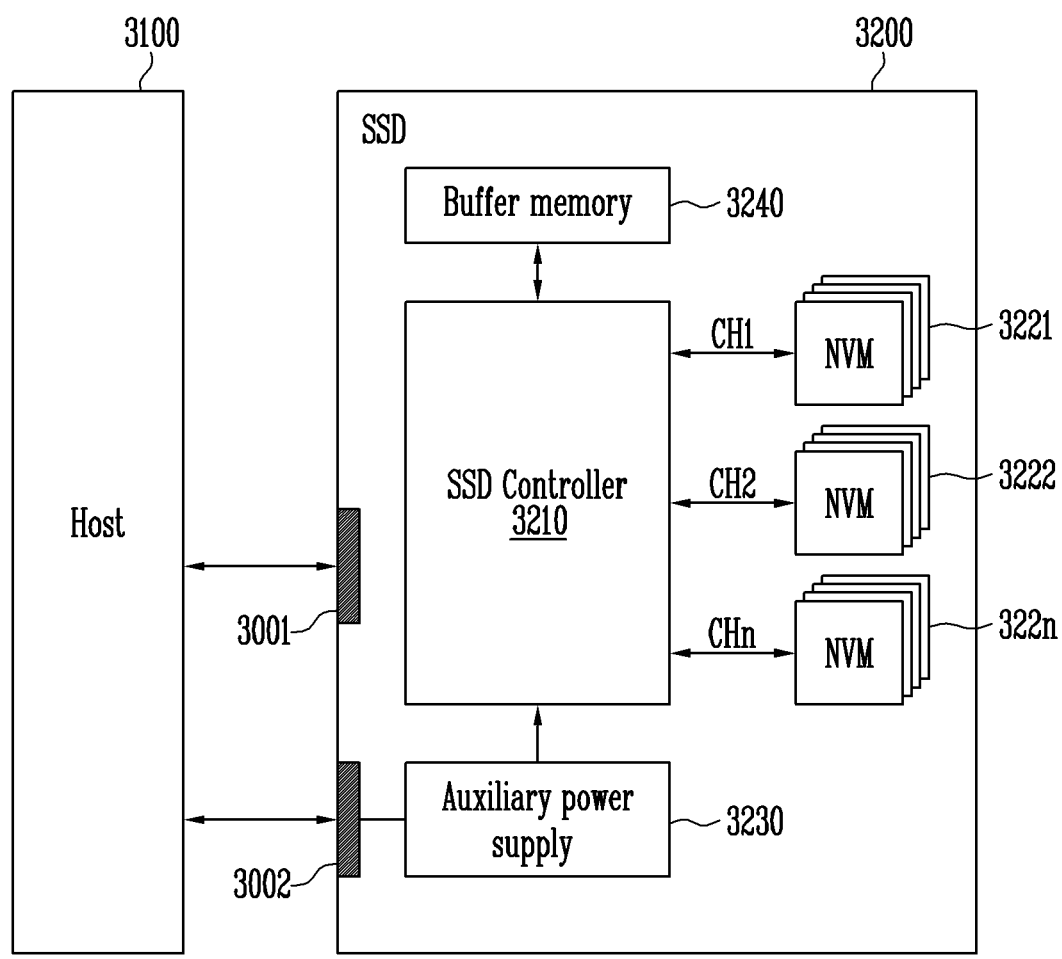
FIG. 15 illustrates an embodiment of a Solid State Drive (SSD) system.

FIG. 15 illustrates an embodiment of a Solid State Drive (SSD) system 3000 to which the storage device may be applied. Referring to FIG. 15, SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322*n*, an auxiliary power supply 3230, and a buffer memory 3240.

In an embodiment, the SSD controller 3210 may serve as the memory controller (200 shown in FIG. 1). For example, the SSD controller 3210 may control the plurality of flash memories 3221 to 322*n* in response to a signal SIG received from the host 3100. In an example, the signal SIG may be a signal based on an interface between the host 3100 and the SSD 3200. For example, the signal SIG may be defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

In an embodiment, the SSD controller 3210 may translate a logical block address (LBA) into a physical block address (PBA), based on a request received from the host (300 shown in FIG. 1). For example, when the request received from the host (300 shown in FIG. 1) is a program request, a read request, or an erase request, the SSD controller 3210 may address the LBA in a 512-byte unit. For example, a column address among addresses included in the PBA may be addressed in the 512-byte unit.

Further, the SSD controller 3210 may output a column address to a selected flash memory among the plurality of flash memories 3221 to 322*n* during only one cycle among five cycles in which an address is input, and may output a row address to the selected flash memory among the plurality of flash memories 3221 to 322*n* during the other four cycles. For example, since the column address is addressed in the 512-byte unit, the SSD controller 3210 may input the column address during only one cycle. In addition, since a bit number for expressing the row address is increased, the SSD controller 3210 may output the increased bit number to the selected flash memory among the plurality of flash memories 3221 to 322*n* during four cycles.

In an embodiment, when the request received from the host (300 shown in FIG. 1) is the program request, the read request, or the erase request, the SSD controller 3210 may generate a command representing that the LBA is to be addressed in the 512-byte unit. For example, the SSD controller 3210 may generate a new command representing that the column address is to be addressed in the 512-byte unit, instead of a command corresponding to the existing program request, the existing read request, or the existing erase request. The SSD controller 3210 may output the generated new command to the selected flash memory among the plurality of flash memories 3221 to 322n.

In an embodiment, the selected flash memory among the plurality of flash memories 3221 to 322n may perform an operation corresponding to the new command by determining the addressing unit is the 1-byte unit or the 512-byte unit, based on the command.

The auxiliary power supply 3230 is coupled to the host 3100 through the power connector 3002. When the supply of power from the host 3100 is not smooth, the auxiliary power supply 3230 may provide power of the SSD 3200. In an example, the auxiliary power supply 3230 may be located in the SSD 3200 or may be located externally and coupled to the SSD 3200. For example, the auxiliary power supply 3230 may be located on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (e.g., a mapping table) of the flash memories 3221 to 322n. The buffer memory 3240 may be a volatile memory. Examples include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 16:
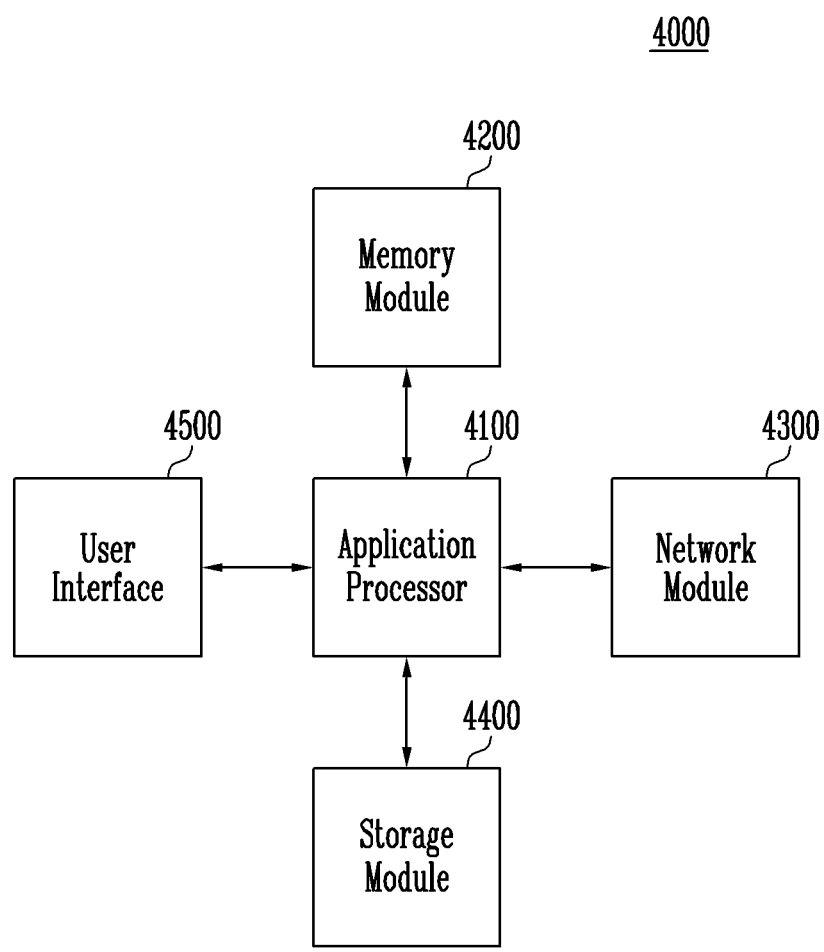
FIG. 16 illustrates an embodiment of a user system.

FIG. 16 illustrates an embodiment of a user system 4000 to which the storage device may be applied. Referring to FIG. 16, user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

In an embodiment, the application processor 4100 may translate a logical block address (LBA) into a physical block address (PBA), based on a request received from the host (300 shown in FIG. 1). For example, when the request received from the host (300 shown in FIG. 1) is a program request, a read request, or an erase request, the application processor 4100 may address the LBA in a 512-byte unit. For example, a column address among addresses included in the PBA may be addressed in the 512-byte unit.

Further, the application processor 4100 may output a column address to the storage module 4400 during only one cycle among five cycles in which an address is input, and output a row address to the storage module 4400 during the other four cycles. For example, since the column address is addressed in the 512-byte unit, the application processor 4100 may input the column address during only one cycle. In addition, since a bit number for expressing the row address is increased, the application processor 4100 may output the increased bit number to the storage module 4400 during four cycles.

In an embodiment, when the request received from the host (300 shown in FIG. 1) is the program request, the read request, or the erase request, the application processor 4100 may generate a command representing that the LBA is to be addressed in the 512-byte unit. For example, the application processor 4100 may generate a new command representing that the column address is to be addressed in the 512-byte unit, instead of a command corresponding to the existing program request, the existing read request, or the existing erase request, and output the generated new command to the storage module 4400.

In an embodiment, the storage module 4400 may perform an operation corresponding to the new command by determining the addressing unit is the 1-byte unit or the 512-byte unit, based on the command.

The memory module 4200 may operate as a main memory, working memory, buffer memory or cache memory of the user system 4000. Examples of the memory module 4200 include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. Examples of the storage module 4400 include a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, which, for example, may operate identically to the memory device described with reference to FIGS. 2 and 3. The storage module 4400 may operate identically to the storage device 50 described with reference to FIG. 1.

The user interface 4500 may include interfaces for inputting data or commands to the application processor 4100 or outputting data to an external device. In an example, the user interface 4500 may include user input interfaces, e.g., a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces, e.g., a Liquid Crystal Display (LCD), Organic Light Emitting Diode (OLED) display device, Active Matrix OLED (AMOLED) display device, an LED, a speaker, and a monitor.

In accordance with one or more of the aforementioned embodiments, the unit used to express an address is changed so that a number of chips included in the memory device can increase.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure. The embodiments may be combined to form additional embodiments.

Meanwhile, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

Example embodiments have been disclosed herein, and although specific terms are employed, the terms are used and are to be interpreted in a generic and descriptive sense only, and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory controller comprising:
a flash translation layer configured to translate a logical block address received from a host into a physical block address, wherein the flash translation layer determines an addressing unit for column addresses included in the physical block address based on a request received from the host; and
a command controller configured to generate a command representing the addressing unit based on the request,
wherein the column addresses specify column lines of memory cells and are expressed in byte addressing of a 1-byte unit or block addressing of a multi-byte unit,
wherein the column addresses sequentially increase by 1 byte in the byte addressing or sequentially increase by multiple bytes in the block addressing, and
wherein the addressing unit indicates whether the column addresses are translated according to the byte addressing or the block addressing.

2. The memory controller of claim 1, wherein, when the request is one of a program request, a read request, and an erase request, the flash translation layer translates the logical block address into the physical block address by changing the addressing unit for at least one column address included in the physical block address.

3. The memory controller of claim 2, wherein the flash translation layer translates the logical block address into the physical block address by increasing the addressing unit of a column address among the column addresses included in the physical block address.

4. The memory controller of claim 2, wherein the flash translation layer translates the logical block address into the physical block address by maintaining an addressing unit of a row address among a plurality of addresses included in the physical block address.

5. The memory controller of claim 4, wherein the flash translation layer addresses the row address by increasing a bit number representing a word line.

6. The memory controller of claim 2, wherein the flash translation layer:
outputs a column address among a plurality of addresses included in the physical block address during one period, and
outputs a row address among the plurality of addresses included in the physical block address during four periods.

7. The memory controller of claim 1, wherein, when the request is one of a program request, a read request, and an erase request, the command controller generates a command representing that the addressing unit for the column addresses included in the physical block address has been changed.

8. A memory device, comprising:
an input/output circuit configured to receive a command and an address;
a column decoder configured to decode a column address in the address; and
a control logic configured to receive the command and the address from the input/output circuit and control the input/output circuit and the column decoder to perform an operation based on the command and the address, wherein the control logic generates a selection signal based on whether the command represents an addressing unit for the column address,
wherein the column address specifies a column line of memory cells and is expressed in byte addressing of a 1-byte unit or block addressing of a multi-byte unit,
wherein the column addresses sequentially increase by 1 byte in the byte addressing or sequentially increase by multiple bytes in the block addressing, and
wherein the addressing unit indicates whether the column addresses are translated according to the byte addressing or the block addressing.

9. The memory device of claim 8, wherein:
when the command is one of a program command, a read command, and an erase command, the addressing unit for the column address is a first unit, and
when the command represents that the column address has been addressed in the first unit, the control logic outputs the selection signal for controlling the column address to be decoded in the first unit.

10. The memory device of claim 9, wherein:
when the command is a command except the program command, the read command, and the erase command, the addressing unit for the column address is a second unit, and
the second unit is smaller than the first unit.

11. The memory device of claim 10, wherein, when the command represents that the column address has been addressed in the second unit, the control logic outputs the selection signal to control the column address to be decoded in the second unit.

12. The memory device of claim 11, wherein the column decoder decodes the column address based on the selection signal and outputs a column address signal indicating that the column address is a column address of the first unit or the second unit.

13. A storage device, comprising:
a memory device, and
a memory controller configured to control the memory device,
wherein the memory controller translates a logical block address received from a host into a physical block address and outputs the physical block address to the memory device,
wherein the memory controller determines an addressing unit for column addresses included in the physical block address based on a request from the host, and generates a command representing the addressing unit,
wherein the memory device generates a selection signal based on the command representing the addressing unit,
wherein the column addresses specify column lines of memory cells and are expressed in byte addressing of a 1-byte unit or block addressing of a multi-byte unit,
wherein the column addresses sequentially increase by 1 byte in the byte addressing or sequentially increase by multiple bytes in the block addressing, and
wherein the addressing unit indicates whether the column addresses are translated according to the byte addressing or the block addressing.

14. The storage device of claim 13, wherein, when the request is one of a program request, a read request, and an erase request, the memory controller translates the logical block address into the physical block address by changing the addressing unit of at least one of the plurality of addresses in the physical block address.

15. The storage device of claim 14, wherein the memory controller translates the logical block address into the physical block address by increasing the addressing unit for the column addresses in the physical block address.

16. The storage device of claim 14, wherein the memory controller translates the logical block address into the physical block address by maintaining an addressing unit of a row address among the plurality of addresses in the physical block address.

17. The storage device of claim 16, wherein the memory controller addresses the row address by increasing a bit number representing a word line.

18. The storage device of claim 14, wherein the memory controller outputs a column address among the plurality of addresses in the physical block address to the memory device during one period, and outputs a row address among the plurality of addresses in the physical block address to the memory device during four periods.

19. The storage device of claim 13, wherein:
when the command is one of a program command, a read command, and an erase command, the addressing unit for the column addresses is a first unit, and
when the command represents that the column addresses have been addressed in the first unit, the selection signal is a set value.

20. The storage device of claim 19, wherein:
when the command is one of a status read command, a register setting command, and a register read command, the addressing unit for the column addresses is a second unit, and
the second unit is smaller than the first unit.

\* \* \* \* \*